US008672804B2

(12) United States Patent
Okubo et al.

(10) Patent No.: US 8,672,804 B2
(45) Date of Patent: Mar. 18, 2014

(54) HYBRID VEHICLE DRIVING SYSTEM

(75) Inventors: Shinichi Okubo, Saitama (JP);
Takayuki Kishi, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/643,446

(22) PCT Filed: Apr. 26, 2011

(86) PCT No.: PCT/JP2011/060186
§ 371 (c)(1),
(2), (4) Date: Oct. 25, 2012

(87) PCT Pub. No.: WO2011/136235
PCT Pub. Date: Nov. 3, 2011

(65) Prior Publication Data
US 2013/0045833 A1    Feb. 21, 2013

(30) Foreign Application Priority Data
Apr. 30, 2010    (JP) ................ 2010-105477

(51) Int. Cl.
*B60W 10/08* (2006.01)
(52) U.S. Cl.
USPC .................................................. 477/5
(58) Field of Classification Search
USPC ................................. 477/5; 180/65.7
See application file for complete search history.

(56) References Cited

U.S. PATENT DOCUMENTS

| | | | | |
|---|---|---|---|---|
| 6,634,247 B2 * | 10/2003 | Pels et al. | ......... | 74/329 |
| 6,887,180 B2 * | 5/2005 | Pels et al. | ......... | 477/3 |
| 7,082,850 B2 * | 8/2006 | Hughes | ......... | 74/329 |
| 7,249,537 B2 * | 7/2007 | Lee et al. | ......... | 74/661 |
| 7,604,565 B2 * | 10/2009 | Lee et al. | ......... | 477/3 |
| 7,670,256 B2 * | 3/2010 | Winkelmann et al. | ......... | 477/5 |
| 8,297,141 B2 * | 10/2012 | Cimatti et al. | ......... | 74/330 |
| 8,366,584 B2 * | 2/2013 | Stefani et al. | ......... | 477/5 |
| 2012/0179320 A1* | 7/2012 | Abe et al. | ......... | 701/22 |
| 2012/0245781 A1* | 9/2012 | Kanamori et al. | ......... | 701/22 |
| 2013/0096761 A1* | 4/2013 | Kuroda et al. | ......... | 701/22 |

FOREIGN PATENT DOCUMENTS

| | | |
|---|---|---|
| JP | 11-037260 A | 2/1999 |
| JP | 2003-113932 A | 4/2003 |
| JP | 2009-035168 A | 2/2009 |
| JP | 2009-132250 A | 6/2009 |
| JP | 2009-154610 A | 7/2009 |
| WO | 2009/017034 A1 | 2/2009 |

OTHER PUBLICATIONS

International Search Report for PCT/JP2011/060186, mailing date of Aug. 2, 2011.

* cited by examiner

*Primary Examiner* — Dirk Wright
(74) *Attorney, Agent, or Firm* — Westerman, Hattori, Daniels & Adrian, LLP

(57) ABSTRACT

In a hybrid vehicle in which power of electric motor is transmitted to a counter shaft 14 only via a lock mechanism 61 which is provided on a first main shaft 11 so as to make up an odd-numbered gear or a first gear change shifter 51, when the vehicle is being driven by selecting a given even-numbered gear, a pre-shifting to an odd-numbered gear which is lower than the given even-numbered gear is implemented by the lock mechanism 61 or the first gear change shifter 51. By so doing, not only can good driveability be provided with the assistance of the electric motor, but also a more efficient regeneration can be implemented.

11 Claims, 17 Drawing Sheets

FIG. 7
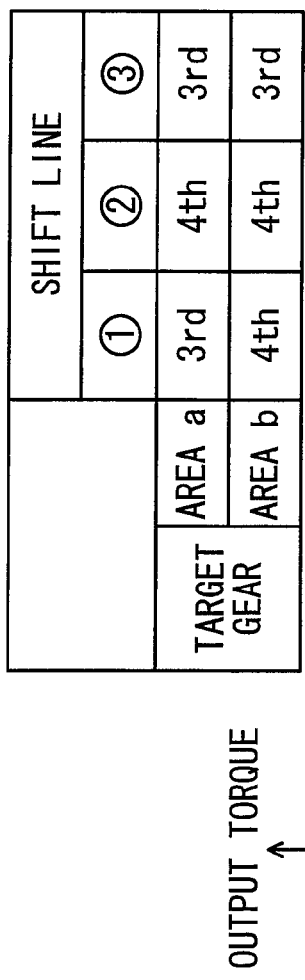
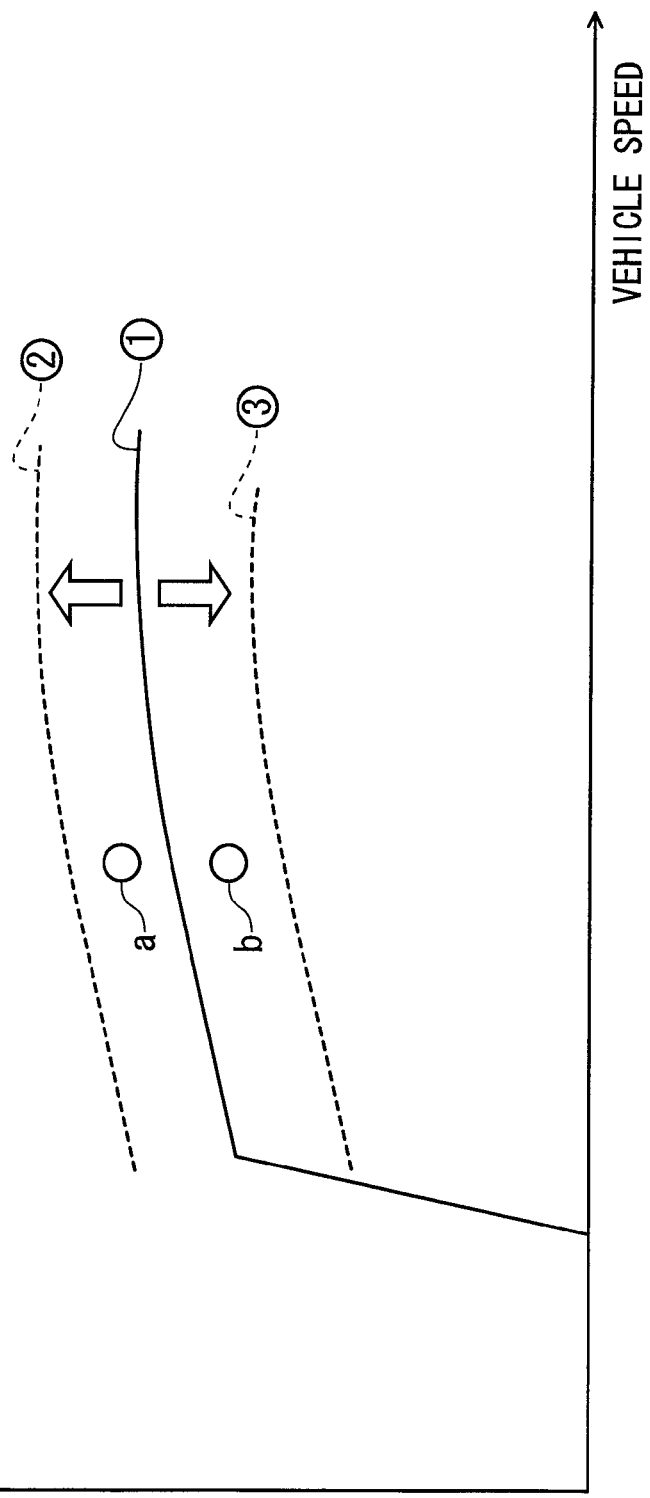

5-4-3Down

HYBRID VEHICLE DRIVING SYSTEM

TECHNICAL FIELD

The present invention relates to a hybrid vehicle driving system.

BACKGROUND ART

Conventionally, hybrid vehicles are driven by driving an electric motor and/or an internal combustion engine as a drive source and can be driven in various driving modes including an EV driving mode in which the vehicle is driven only by power of the electric motor and an engine driving move in which the vehicle is driven only by power of the internal combustion engine.

In Patent Literature 1, as shown in FIG. 17, a vehicle driving system 200 includes input shafts 203, 204 which are connected to clutches C1, C2, respectively, so that output torque of a power source 201 is inputted thereinto, output shafts 205, 206 which output their output torque to an output member 212, and switching mechanisms S1 to S4 which selectively set transmission conditions between the input shafts 203, 204 and the output shafts 205, 206. The vehicle driving system 200 further includes a dual-clutch type transmission for controlling the clutches C1, C2 and the switching mechanisms S1 to S4 to thereby set plural shift positions. The output shaft 206, which is one of the output shafts, is connected to an electric motor 217 for power transmission.

In automatic gear changes by the dual-clutch type transmission, when upshifting, for example, from a first speed gear to a second speed gear, the second switching mechanism S2 for transmitting power from the first input shaft 203 to the first output shaft 205 via a second speed gear pair 209 is operated in advance for shifting (pre-shifted). Then, the second clutch C2 which is engaged in the first speed is released, and the first clutch C1 is engaged, whereby the second speed is set.

RELATED ART LITERATURE

Patent Literature

Patent Literature 1: JP-2009-154610-A

SUMMARY OF THE INVENTION

Problem that the Invention is to Solve

Meanwhile, in a hybrid vehicle driving system, it is desired to minimize a shock by making a torque loss in changing gears as small as possible. However, Patent Literature 1 does not mention that fact. In particular, also in a hybrid vehicle in which power of an electric motor is transmitted to an output shaft only via a gear changing mechanism which is provided on one of two input shafts, it is desired that a gearshift shock is suppressed. In addition, in a hybrid vehicle driving system, it is fundamental that energy that is obtained by regeneration is made use of for the power of an electric motor, and it is desired that the electric motor implements more efficient regeneration.

The invention has been made in view of the situations described above, and an object thereof is to provide a hybrid vehicle driving system which can provide good driveability with the assistance of an electric motor and which can implement more efficient regeneration.

Means for Solving the Problem

With a view to attaining the object, Claim 1 defines a hybrid vehicle driving system, including:
 an internal combustion engine (e.g., an engine 6 in embodiment);
 an electric motor (e.g., a motor 7 in embodiment);
 a battery unit (e.g., a battery 3 in embodiment) which supplies electric power to the electric motor; and
 a transmission mechanism (e.g., a transmission 20 in embodiment) including
  a first input shaft (e.g., a first main shaft 11 in embodiment) which is connected to the electric motor and which is connected selectively to the internal combustion engine via a first engaging/disengaging unit (e.g., a first clutch 41 in embodiment),
  a second input shaft (e.g., a second main shaft 12 in embodiment) which is connected selectively to the internal combustion engine via a second engaging/disengaging unit (e.g., a second clutch 42 in embodiment),
  a first change-speed gear mechanism (e.g., a planetary gear mechanism 30, a third speed gear pair 23, a fifth speed gear pair 25 in embodiment) which can configure a plurality of first gear levels in a power transmission path between the first input shaft and a driven portion,
  a second change-speed gear mechanism (e.g., a second speed gear pair 22, a fourth speed gear pair 24 in embodiment) which can configure a plurality of second gear levels in a power transmission path between the second input shaft and a driven portion,
  a first synchromesh unit (e.g., a lock mechanism 61, a first gear change shifter 51 in embodiment) which switches the first change-speed gear mechanism so as to select any one of the first gear levels and
  a second synchromesh unit (e.g., a second gear change shifter 52 in embodiment) which switches the second change-speed gear mechanism so as to select any one of the second gear levels,
 wherein, when the vehicle is being driven by selecting a given second gear level by the second synchromesh unit, a pre-shifting to a first gear level which is lower than the given second gear level is implemented by the first synchromesh unit.

Claim 2 defines, based on Claim 1, the system,
 wherein, in the event that the electric motor is overspeeding, the electric motor is in a high temperature state, or the battery is in a cryogenic temperature state, when the vehicle is being driven by selecting the given second gear level by the second synchromesh unit, a pre-shifting to a first gear level which is upper than the given second gear level is implemented by the first synchromesh unit.

Claim 3 defines, based on Claim 2, the system,
 wherein, in the event that the battery is in the cryogenic temperature state, when downshifting from the given second gear level, the first engaging/disengaging unit is slide engaged to match a revolution speed of the electric motor with a revolution speed of the internal combustion engine, whereafter with the first engaging/disengaging unit released, a first gear level which is one gear lower is selected by the first synchromesh unit, and thereafter, the first engaging/disengaging unit is applied.

Claim 4 defines, based on Claim 1, the system,
 wherein, when the vehicle is being driven by selecting a given first gear level by the first synchromesh unit, in the event that a downshifting to a first gear level which is two gears lower is implemented due to a drastic increase in accelerator pedal opening, with both the first and second engaging/disengaging units applied by bringing both of them into slide engagement, the first change-speed gear mechanism is continuously switched from the given first gear level to the first gear level which is two gears lower via a second gear level which is one gear lower during an inertia phase thereof.

Claim 5 defines, based on Claim 1, the system,
wherein a shift map has an upshift line and a downshift line which are set individually to be offset from a BSFC bottom torque line which bottom traces a BSFC of the internal combustion engine for each gear level, and the upshift line and the downshift line have individually a pre-shift line for implementing a pre-shifting to the next gear level immediately before the upshift line and the downshift line are crossed.

Claim 6 defines, based on Claim 5, the system,
wherein the shift map offsets the upshift line, the downshift line and the pre-shift line to a high torque side according to a torque of the electric motor which is available for assistance.

Claim 7 defines, based on Claim 5, the system,
wherein the shift map offsets the upshift line, the downshift line and the pre-shift line to the high torque side or a low torque side according to an upper limit output torque of the internal combustion engine.

Claim 8 defines, based on Claim 1, the system,
wherein a pre-shifting to a first gear level which is one gear lower than the given second gear level by the first synchromesh unit is implemented by
holding the first gear level which is one gear lower when upshifting to the given second gear level from the first gear level which is one gear lower, and
engaging the first gear level which is one gear lower when downshifting to the given second gear level from a first gear level which is one gear upper.

Claim 9 defines, based on Claim 1, the system,
wherein, in the event that an output of the internal combustion engine surpasses a BSFC bottom torque line of the internal combustion engine,
when a pre-shifting to a first gear level which is one gear lower than the given second gear level is implemented, or a kickdown to a lowest possible gear level is implemented, the electric motor performs an assistance, and
when the pre-shifting is not implemented, the assistance by the electric motor is prohibited.

Claim 10 defines, based on Claim 1, the system,
wherein, in the event that a pre-shifting to the first gear level is implemented by the first synchromesh unit when the vehicle is being driven by selecting the given second gear level, power that is transmitted to the internal combustion engine via the second engaging/disengaging unit can be absorbed by regeneration of the electric motor.

Claim 11 defines, based on Claim 1, the system,
wherein a downshift line of a shift map is set to a BSFC bottom torque line except for a state where a throttle is fully opened, and
wherein, with the vehicle being driven by selecting the given second gear level, when a downshifting to a first gear level which is one gear lower is implemented due to an increase in accelerator pedal opening from a state where the first gear level which is one gear upper is pre-shifted, the internal combustion engine holds an output along the BSFC bottom torque line, a gear change is implemented when the torque of the electric motor becomes 0 Nm, and surplus torque is absorbed by regeneration of the electric motor from a time point when an inertia phase ends.

Advantage of the Invention

According to Claims 1 and 8 to 10, even in the hybrid vehicle in which the power of the electric motor is transmitted to the driven portion only via the first change-speed gear mechanism which is provided on the first input shaft, when the vehicle is being driven by selecting the given second gear level, by implementing the pre-shifting to the first gear level which is lower than the given second gear level, good driveability can be provided with the assistance of the electric motor. In addition, a more efficient regeneration can be implemented.

According to Claim 2, the electric motor is allowed to assist efficiently by implementing the pre-shifting according to the conditions of the electric motor and the battery, thereby providing good driveability.

According to Claim 3, when the battery is in the cryogenic temperature state, the downshifting from the given second gear level can be implemented without any shift shock.

According to Claim 4, the kickdown from the given first gear level to the first gear level which is two gears lower can be implemented within a short time period.

According to Claim 5, the pre-shifting can be implemented by use of the shift map.

According to Claim 6, the internal combustion engine can be used in higher speed gears for a long time period, thereby providing a good fuel economy while suppressing the shift hunting.

According to Claim 7, when the upper limit output torque of the engine is lowered due to driving the vehicle in a hill area, the vehicle can be driven in low speed gears for a long time period by offsetting the upshift line, the downshift line and the pre-shift line to the low torque side, thereby obtaining a desired torque.

According to Claim 11, when a downshifting from a state where the first gear level which is one gear upper is pre-shifted to the first gear level which is one gear lower is implemented due to an increase in accelerator pedal opening while the vehicle is being driven by selecting the given second gear level, the shift shock can be reduced, and downshifting can be implemented efficiently.

BRIEF DESCRIPTION OF THE DRAWINGS

FIG. 7 illustrates the offsetting of shift lines.

MODE FOR CARRYING OUT THE INVENTION

Hereinafter, an embodiment of a hybrid vehicle driving system which can install a control unit of the invention will be described by reference to the drawings.

Figure 1:
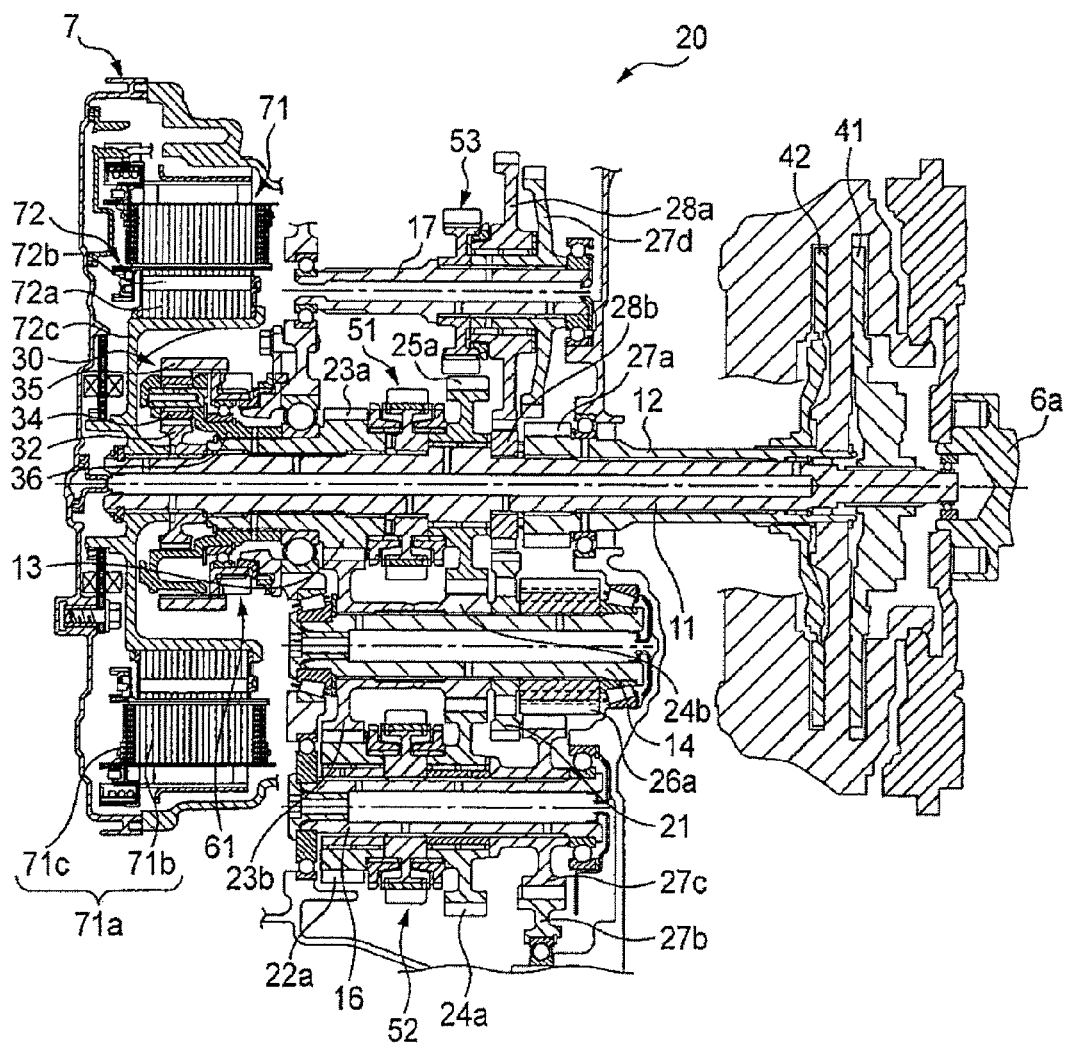
FIG. 1 cross-sectionally shows an example of a hybrid vehicle driving system of the invention.
Figure 2:
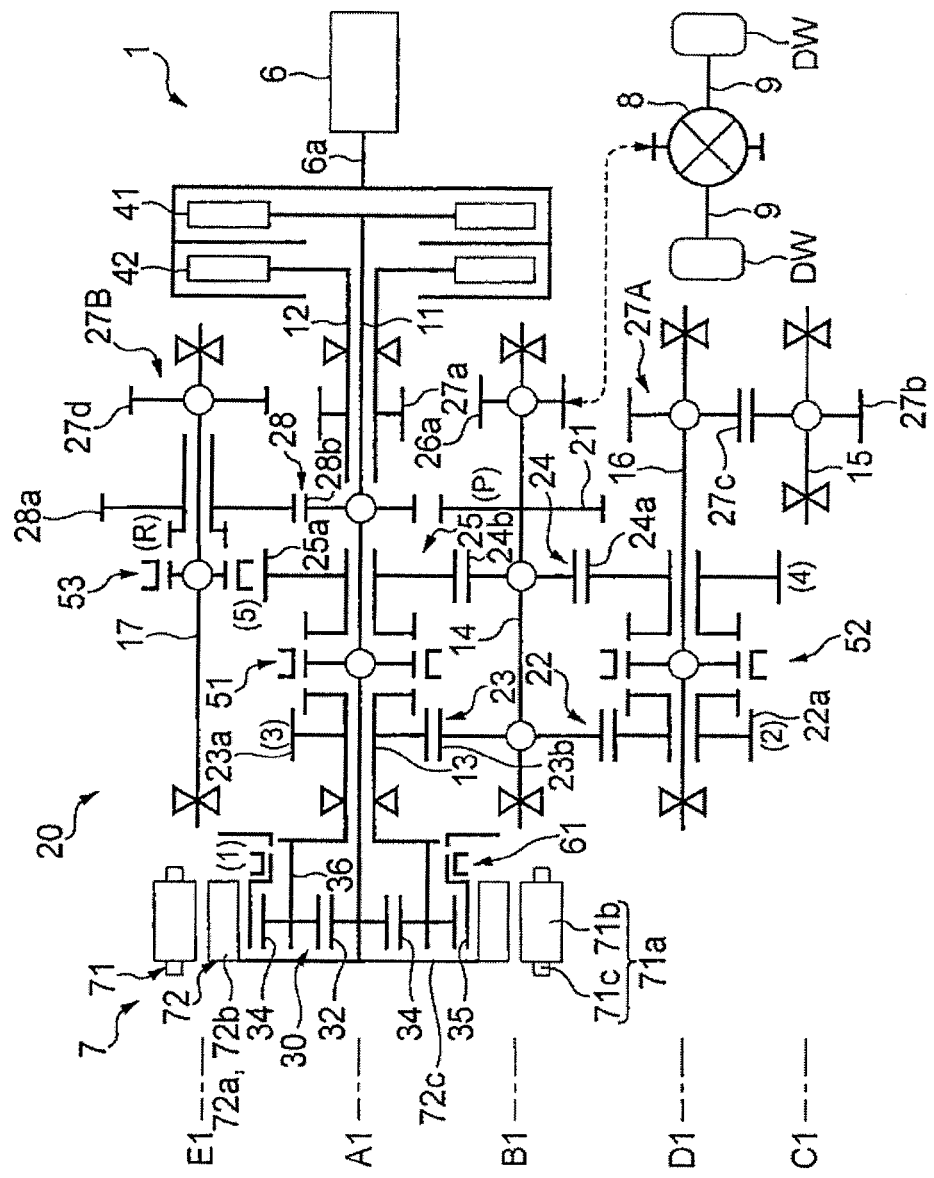
FIG. 2 schematically shows the hybrid vehicle driving system of FIG. 1.

A hybrid vehicle driving system (vehicle driving system) 1 of this embodiment is designed to drive driving wheels DW, DW (driven portions) of a vehicle (not shown) via drive shafts 9, 9 thereof as shown in FIGS. 1 and 2 and includes an internal combustion engine (engine) 6 which is a drive source, an electric motor (motor) 7, and a transmission 20 for transmitting power to the driving wheels DW, DW.

The engine 6 is, for example, a gasoline engine or a diesel engine, and a first clutch 41 (a first engaging/disengaging unit) and a second clutch (a second engaging/disengaging unit) 42 of the transmission 20 are provided on a crankshaft 6a of this engine 6.

The motor 7 is a three-phase, brushless DC motor and has a stator 71 which includes 3n armatures 71a and a rotor 72 which is disposed so as to face the stator 71. The armatures 71a each include an iron core 71b and a coil 71c which is wound around the iron core 71b and are fixed to a casing, not shown, so as to be aligned about a rotational axis at substantially equal intervals in a circumferential direction. 3n coils 71c make up n sets of coils of three phases; a U phase, a V phase and a W phase.

The rotor 72 has an iron core 72a and n permanent magnets 72b which are aligned about the rotational axis at substantially equal intervals, and any two permanent magnets 72b which lie adjacent to each other have different polarities. A fixing portion 72c which fixes the iron core 72a is a hollow cylindrical member which is made of a magnetically soft material, is disposed on an outer circumferential side of a ring gear 35 of a planetary gear mechanism 30, which will be described later, and is connected to a sun gear 32 of the planetary gear mechanism 30. By so doing, the rotor 72 is made to rotate together with the sun gear 32 of the planetary gear mechanism 30.

The planetary gear mechanism 30 has the sun gear 32, the ring gear 35 which is disposed concentrically with the sun gear 32 and which is disposed so as to surround the periphery of the sun gear 32, planetary gears 34 which are made to mesh with the sun gear 32 and the ring gear 35, and a carrier 36 which supports the planetary gears 34, allowing them to revolve on their own axes and roll "walk" around the sun gear 32. In this way, the sun gear 32, the ring gear 35 and the carrier 36 are made to rotate differentially relative to each other.

A lock mechanism 61 (a first synchromesh unit), which has a synchromesh mechanism (a synchronizer mechanism) and which is adapted to stop (lock) the rotation of the ring gear 35, is provided on the ring gear 35. A friction engagement unit made up of a brake and a sleeve may be used as the lock mechanism 61.

The transmission 20 is a so-called double-clutch type transmission which includes the first clutch 41 and the second clutch 42 that have been described above, the planetary gear mechanism 30, and plural gear trains, which will be described later.

More specifically, the transmission 20 includes a first main shaft 11 (a first input shaft) which is disposed coaxially with a crankshaft 6a of the engine 6 (a rotational axis A1), a second main shaft 12 (a second input shaft), a connecting shaft 13, a counter shaft 14 (an output shaft) which can rotate about a rotational axis B1 which is disposed parallel to the rotational axis A1, a first intermediate shaft 15 which can rotate about a rotational axis C1 which is disposed parallel to the rotational axis A1, a second intermediate shaft 16 which can rotate about a rotational axis D1 which is disposed parallel to the rotational axis A1, and a reverse shaft 17 which can rotate about a rotational axis E1 which is disposed parallel to the rotational axis A1.

The first clutch 41 is provided at an end of the first main shaft 11 which faces the engine 6, while the sun gear 32 of the planetary gear mechanism 30 and the rotor 72 of the motor 7 are mounted at an opposite end of the first main shaft 11 to the end which faces the engine 6. Consequently, the first main shaft 11 is selectively connected to the crankshaft 6a of the engine 6 by the first clutch 41 and is connected directly to the motor 7 so that power of the engine 6 and/or the motor 7 is transmitted to the sun gear 32.

The second main shaft 12 is formed shorter than the first main shaft 11 and hollow and is disposed rotatably relative to the first main shaft 11 so as to cover the periphery of a portion of the first main shaft 11 which lies closer to the engine 6. In addition, the second clutch 42 is provided at an end of the second main shaft 12 which faces the engine 6 and an idle drive gear 27a is mounted integrally on the second main shaft 12 at an opposite end to the end which faces the engine 6. Consequently, the second main shaft 12 is selectively connected to the crankshaft 6a of the engine 6 by the second clutch 42 so that power of the engine 6 is transmitted to the idle drive gear 27a.

The connecting shaft 13 is formed shorter than the first main shaft 11 and hollow and is disposed rotatably relative to the first main shaft 11 so as to cover the periphery of a portion of the first main shaft 11 which lies opposite to the engine 6. In addition, a third speed drive gear 23a is mounted integrally on the connecting shaft 13 at an end which faces the engine 6, and the carrier 36 of the planetary gear mechanism 30 is mounted integrally on the connecting shaft 13 at an end which lies opposite to the end which faces the engine 6. Consequently, by revolution of the planetary gears 34, the carrier 36 and the third speed drive gear 23a which are mounted on the connecting shaft 13 are made to rotate together.

Further, provided and mounted on the first main shaft 11 between the third speed drive gear 23a mounted on the connecting shaft 13 and the idle drive gear 27a mounted on the second main shaft 12 are a fifth speed drive gear 25a which rotates relative to the first main shaft 11 and a reverse driven gear 28b which rotates together with the first main shaft 11. Further, a first gear change shifter (a first synchromesh unit) 51, which connects the first main shaft 11 with the third speed drive gear 23a or the fifth speed drive gear 25a and releases the connection therebetween, is provided between the third speed drive gear 23a and the fifth speed drive gear 25a. In addition, when the first gear change shifter 51 is engaged in a third speed engaging position, the first main shaft 11 and the third speed drive gear 23a are connected together to rotate together, while when the first gear change shifter 51 is engaged in a fifth speed engaging position, the first main shaft 11 and the fifth speed drive gear 25a rotate together. In addition, when the first gear change shifter 51 is in a neutral position, the first main shaft 11 rotates relative to the third speed drive gear 23a and the fifth speed drive gear 25a. Additionally, when the first main shaft 11 and the third speed drive gear 23a rotate together, the sun gear 32 which is mounted on the first main shaft 11 and the carrier 36 which is connected to the third speed drive gear 23a by the connecting shaft 13 rotate together, and the ring gear 35 also rotates together, whereby the planetary gear mechanism 30 is made integral. When this planetary gear mechanism 30 rotates integrally, a third speed driving is implemented, which will be described later. In addition, when the first gear change shifter 51 is in the neutral position and the lock mechanism 61 is engaged in a first speed engaging position, the ring gear 35 is locked, and the rotation of the sun gear 32 is transmitted to the carrier 36 with the rotational speed thereof reduced. By so doing, a first speed driving, which will be described later, is implemented.

A first idle driven gear 27b, which is adapted to mesh with the idle drive gear 27a which is mounted on the second main shaft 12, is mounted on the first intermediate shaft 15.

A second idle driven gear 27c, which is adapted to mesh with the first idle driven gear 27b which is mounted on the first intermediate shaft 15, is mounted on the second intermediate shaft 16. The second idle driven gear 27c makes up a first idle gear train 27A together with the idle drive gear 27a and the first idle driven gear 27b which have been described above. In addition, a second speed drive gear 22a and a fourth speed drive gear 24a, which are adapted to rotate relative to the second intermediate shaft 16, are provided on the second intermediate shaft 16 in such positions that the second speed drive gear 22a and the fourth speed drive gear 24a face the third speed drive gear 23a and the fifth speed drive gear 25a, respectively, which are provided around the first main shaft 11. Further, a second gear change shifter (a second synchromesh unit) 52, which is adapted to connect the second intermediate shaft 16 with the second speed drive gear 22a or the fourth speed drive gear 24a or release the connection of the shaft with the drive gear, is provided between the second speed drive gear 22a and the fourth speed drive gear 24a on the second intermediate shaft 16. Then, when the second gear change shifter 52 is engaged in a second speed engaging position, the second intermediate shaft 16 and the second speed drive gear 22a rotate together, while when the second gear change shifter 52 is engaged in a fourth speed engaging position, the second intermediate shaft 16 and the fourth speed drive gear 24a rotate together. In addition, when the second gear change shifter 52 is in a neutral position, the second intermediate shaft 16 rotates relative to the second speed drive gear 22a and the fourth speed drive gear 24a.

A first common driven gear 23b, a second common driven gear 24b, a park gear 21 and a final gear 26a are mounted integrally on the counter shaft 14 sequentially in that order from an opposite end of the counter shaft 14 to an end which faces the engine 6.

Here, the first common driven gear 23b meshes with the third speed drive gear 23a which is mounted on the connecting shaft 13 to thereby make up a third speed gear pair 23 together with the third speed drive gear 23a and meshes with the second speed drive gear 22a which is provided on the second intermediate shaft 16 to thereby make up a second speed gear pair 22 together with the second speed drive gear 22a.

The second common driven gear 24b meshes with the fifth speed drive gear 25a which is provided on the first main shaft 11 to thereby make up a fifth speed gear pair 25 together with the fifth speed drive gear 25a and meshes with the fourth speed drive gear 24a which is mounted on the second intermediate shaft 16 to thereby make up a fourth speed gear pair 24 together with the fourth speed drive gear 24a.

The final gear 26a meshes with a differential gear mechanism 8, and the differential gear mechanism 8 is connected to the driving wheels DW, DW via the drive shafts 9, 9. Consequently, power transmitted to the counter shaft 14 is outputted from the final gear 26a to the driving wheels DW, DW through the differential gear mechanism 8 and the drive shafts 9, 9.

A third idle driven gear 27d, which is adapted to mesh with the first idle driven gear 27b mounted on the first intermediate shaft 15, is mounted integrally on the reverse shaft 17. The third idle driven gear 27d makes up a second idle gear train 27B together with the idle drive gear 27a and the first idle driven gear 27b which have been described above. In addition, a reverse drive gear 28a, which is adapted to mesh with the reverse driven gear 28b which is mounted on the first main shaft 11, is provided on the reverse shaft 17 so as to rotate relative to the reverse shaft 17. The reverse drive gear 28a makes up a reverse gear train 28 together with the reverse driven gear 28b. Further, a reverse shifter 53, which is adapted to connect the reverse shaft 17 with the reverse drive gear 28a or release the connection of the shaft with the drive gear, is provided on an opposite side of the reverse drive gear 28a to a side which faces the engine 6. Then, when the reverse shifter 53 is engaged in a reverse engaging position, the reverse shaft 17 and the reverse drive gear 28a rotate together, while when the reverse shifter 53 is in a neutral position, the reverse shaft 17 and the reverse drive gear 28a rotate relative to each other.

The first gear change shifter 51, the second gear change shifter 52 and the reverse shifter 53 utilize a clutch mechanism having a synchromesh mechanism (a synchronizer mechanism) which makes rotational speeds of the shaft and the gear which are connected together coincide with each other.

The first main shaft 11 and the second intermediate shaft 16 functions as two transmission shafts in the transmission 20. On the first main shaft 11, an odd-numbered gear train (a first gear train) which is made up of the third speed drive gear 23a and the fifth speed drive gear 25a is provided. On the second intermediate shaft 16, while an even-numbered gear train (a second gear train) which is made up of the second speed drive gear 22a and the fourth speed drive gear 24a is provided.

According to the above-described configuration, the vehicle driving system 1 of this embodiment has following first to fifth power transmission paths.

(1) In a first transmission path, the crankshaft 6a of the engine 6 is connected to the driving wheels DW, DW via the first main shaft 11, the planetary gear mechanism 30, the connecting shaft 13, the third speed gear pair 23 (the third speed drive gear 23a, the first common driven gear 23b), the counter shaft 14, the final gear 26a, the differential gear mechanism 8, and the drive shafts 9, 9. Here, an engine torque corresponding to a first speed is set by a reduction ratio of the planetary gear mechanism 30. More specifically, a product of the reduction ratio of the planetary gear mechanism 30 and a reduction ratio of the third speed gear pair 23 corresponds to the first speed.

(2) In a second transmission path, the crankshaft 6a of the engine 6 is connected to the driving wheels DW, DW via the second main shaft 12, the first idle gear train 27A (the idle drive gear 27a, the first idle driven gear 27b, the second idle driven gear 27c), the second intermediate shaft 16, the second speed gear pair 22 (the second speed drive gear 22a, the first common driven gear 23b) or the fourth speed gear pair 24 (the fourth speed drive gear 24a, the second common driven gear 24b), the counter shaft 14, the final gear 26a, the differential gear mechanism 8, and the drive shafts 9, 9.

(3) In a third transmission path, the crankshaft 6a of the engine 6 is connected to the driving wheels DW, DW via the first main shaft 11, the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8, and the drive shafts 9, 9, without involving the planetary gear mechanism 30.

(4) In a fourth transmission path, the motor 7 is connected to the driving wheels DW, DW via the planetary gear mechanism 30 or the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8, and the drive shafts 9, 9.

(5) In a fifth transmission path, the crankshaft 6a of the engine 6 is connected to the driving wheels DW, DW via the second main shaft 12, the second idle gear train 27B (the idle drive gear 27a, the first idle driven gear 27b, the third idle driven gear 27d), the reverse shaft 17, the reverse gear train 28 (the reverse drive gear 28a, the reverse driven gear 28b), the planetary gear mechanism 30, the connecting shaft 13, the third speed gear pair 23 (the third speed drive gear 23a, the first common driven gear 23b), the counter shaft 14, the final gear 26a, the differential gear mechanism 8, and the drive shafts 9, 9.

The vehicle driving system 1 can implement first to fifth speed drivings and a reverse driving by the engine 6 by controlling the engagement and disengagement of the lock mechanism 61 and the first and second clutches 41, 42 and controlling the engaging positions of the first gear change shifter 51, the second gear change shifter 52 and the reverse shifter 53.

In the first speed driving, the first clutch 41 is applied, and the lock mechanism 61 is engaged, whereby the driving force is transmitted to the driving wheels DW, DW via the first transmission path. In the second speed driving, the second clutch 42 is applied, and the second gear change shifter 52 is engaged in the second speed engaging position, whereby the driving force is transmitted to the driving wheels DW, DW via the second transmission path. In the third speed driving, the first clutch 41 is applied, and the first gear change shifter 51 is engaged in the third speed engaging position, whereby the driving force is transmitted to the driving wheels DW, DW via the third transmission path.

In addition, in the fourth speed driving, the second clutch 42 is applied and the second gear change shifter 52 is engaged in the fourth speed engaging position, whereby the driving force is transmitted to the driving wheels DW, DW via the second transmission path, and in the fifth speed driving, the first clutch 41 is applied and the first gear change shifter 51 is engaged in the fifth speed engaging position, whereby the driving force is transmitted to the driving wheels DW, DW via the third transmission path. Further, the second clutch 42 is applied and the reverse shifter 53 is engaged, whereby the reverse driving is implemented via the fifth transmission path.

Additionally, by appropriately engaging the lock mechanism 61 or the first and second gear change shifters 51, 5 for pre-shifting during an engine driving, the motor 7 is allowed to assist the engine driving or to implement the regeneration. Further, when the engine is idling, the motor 7 is allowed to start the engine 6 or the battery 3 can be charged. Furthermore, by disengaging the first and second clutches 41, 42, an EV driving can be enabled by the motor 7. As EV driving modes, there exist a first speed EV mode in which the first and second clutches 41, 42 are disengaged and the lock mechanism 61 is engaged, whereby the vehicle is allowed to be driven via the fourth transmission path, a third speed EV mode in which the first gear change shifter 51 is engaged in the third speed engaging position, whereby the vehicle is allowed to be driven via the fourth transmission path, and a fifth speed EV mode in which the first gear change shifter 51 is engaged in the fifth speed engaging position, whereby the vehicle is allowed to be driven via the fourth transmission path.

Figure 3:
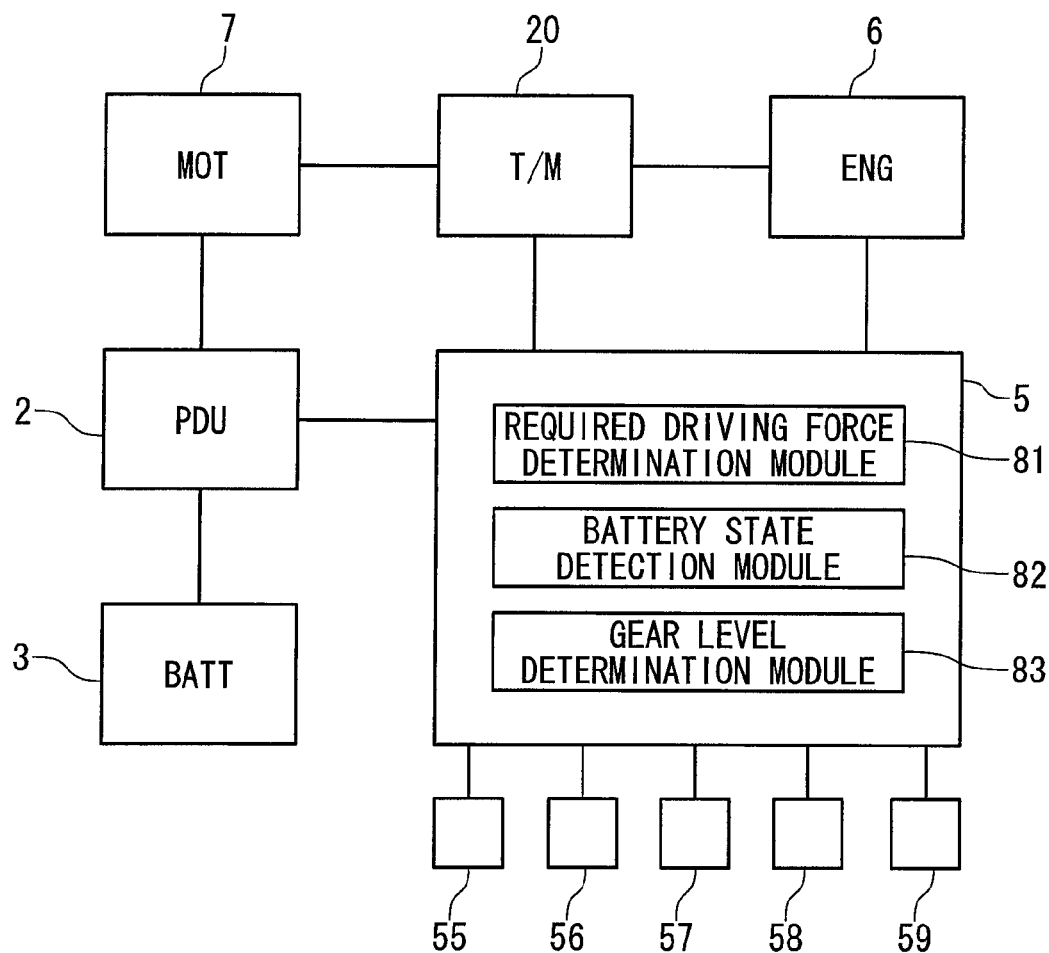
FIG. 3 schematically shows a control unit of the hybrid vehicle driving system of FIG. 1.

As shown in FIG. 3, the motor 7 is connected to a power drive unit (PDU) 2 which controls the operation thereof, and the PDU 2 is connected the battery 3 which supplies electric power to the motor 7 and stores electric power from the motor 7. Namely, the motor 7 is driven by electric power supplied from the battery 3 via the PDU 2, and when the vehicle is decelerated, regenerative generation is implemented by the rotation of the driving wheels DW, DW and the power of the engine 6 so as to charge the battery 3 (recovery of energy).

Additionally, the PDU 2 is connected to a control unit 5 which controls variously the vehicle in whole. Connected to the control unit 5 are a gradient sensor 55 for detecting a gradient of a road surface on which the vehicle is driven, a vehicle speed sensor 56 for detecting a vehicle speed of the vehicle, an accelerator pedal sensor 57 for detecting an operation amount (a depression amount) of an accelerator pedal, a brake pedal sensor 58 for detecting an operation amount (a depression amount) of a brake pedal, and an outside atmospheric pressure sensor 59 for detecting an atmospheric pressure outside the vehicle.

The control unit 5 includes a required driving force determination module 81, a battery state detection module 82 and a gear level determination module 83. Acceleration requirement, braking requirement, engine revolution speed, motor revolution speed, motor temperature, revolution speeds of the first and second main shafts 11, 12, revolution speed of the counter shaft 14, vehicle speed, shift position SOC (State of Charge) and the like are inputted into the control unit 5 by the sensors 55 to 59 that have been described above, while a signal which controls the engine 6, a signal which controls the motor 7, signals signaling a generation state, a charged state and a discharged state of the battery 3, signals which control the first and second gear change shifters 51, 52 and the reverse shifter 53, and a signal which controls the engagement (locking) and release (neutral) of the lock mechanism 61 are outputted from the control unit 5.

Figure 4:
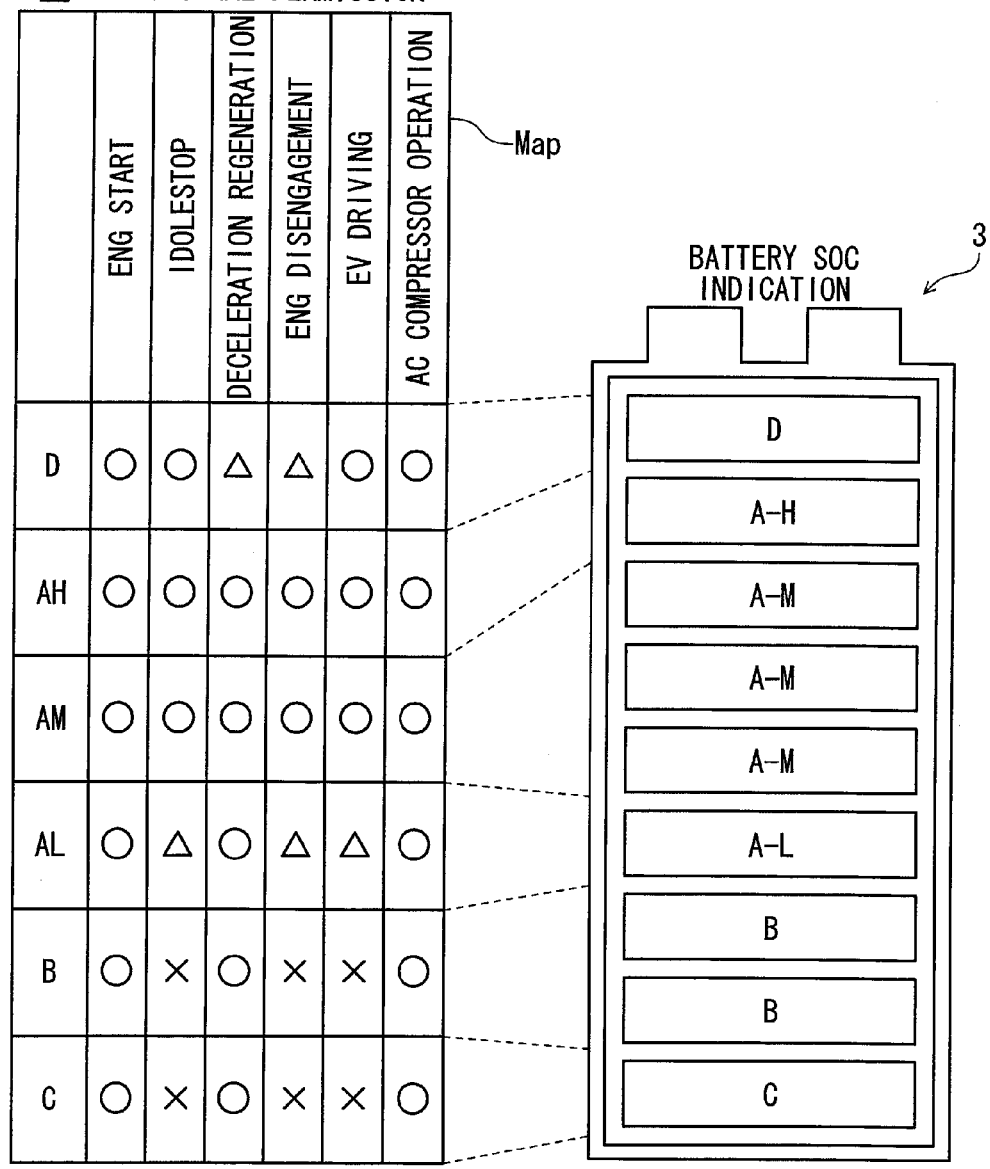
FIG. 4 illustrates a control map.

This control unit 5 has a control map Map as shown in FIG. 4 which determines the permission/prohibition of various controls based on the SOC of the battery 3, and basically, the permission/prohibition of ENG start, idle stop, deceleration regeneration, ENG disengagement, EV driving, and air conditioner compressor driving are determined based on this control map Map. In FIG. 4, ○ denotes permission, x denotes prohibition, and Δ denotes conditional permission.

In this control map Map, SOC is classified into four zones such as C zone, B zone, A zone, and D zone in the order of increasing SOC, and further, the A zone is classified into three zones such as A-L zone, A-M zone and A-H zone in the order of increasing SOC, thus, SOC being classified into six zones. Then, it is controlled so that in the D zone which is close to a maximum charged capacity, deceleration regeneration and ENG disengagement are permitted on condition, in the B zone and the C zone, EV driving and idle stop are prohibited, and the A-M zone functions as a target charged capacity.

The required driving force determination module 81 obtains a required driving force that the counter shaft 14 needs to output according to a vehicle speed V detected by the vehicle speed sensor 56, an accelerator pedal operation amounted detected by the accelerator pedal sensor 57 and a brake pedal operation amount detected by the brake pedal sensor 58. The required driving force determination module 81 obtains a required driving force by use of a shift map M stored in a ROM, shown in FIG. 5, not shown, within the ECU 5.

Figure 5:
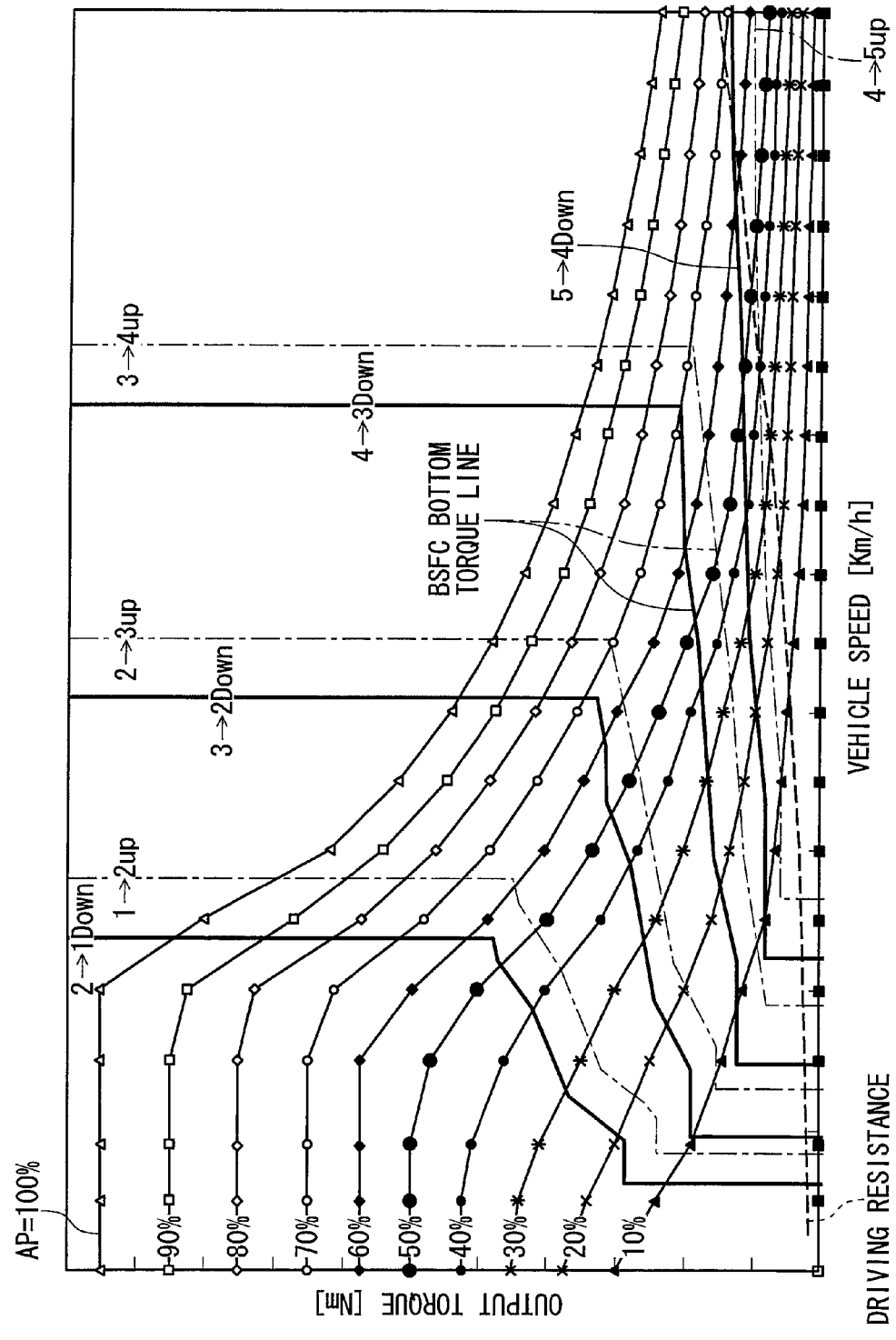
FIG. 5 shows a shift map.

In this configuration, the control unit 5 controls driving states (ENG driving, EV driving, HEV driving) of the vehicle and gear levels of the transmission 20 based on the control map in FIG. 4 and the shift map M in FIG. 5.

The shift map M is set from the viewpoint of fuel economy so that the motor 7 does not assist the engine 6 but only regenerates energy during an engine driving to thereby drive the vehicle in an EV driving as much as possible by energy stored by the regeneration. Because of this, the engine 6 does not output a torque equal to or larger than a BSFC bottom torque in other states than a state where a throttle value is fully opened (WOT: Wide Open Throttle) and in other gears than a lowest possible gear that can be engaged. Additionally, the motor 7 is permitted to assist the engine 6 only when a pre-shifting to a lowest possible gear that can be engaged or a gear which is one gear lower is implemented.

Figure 6:
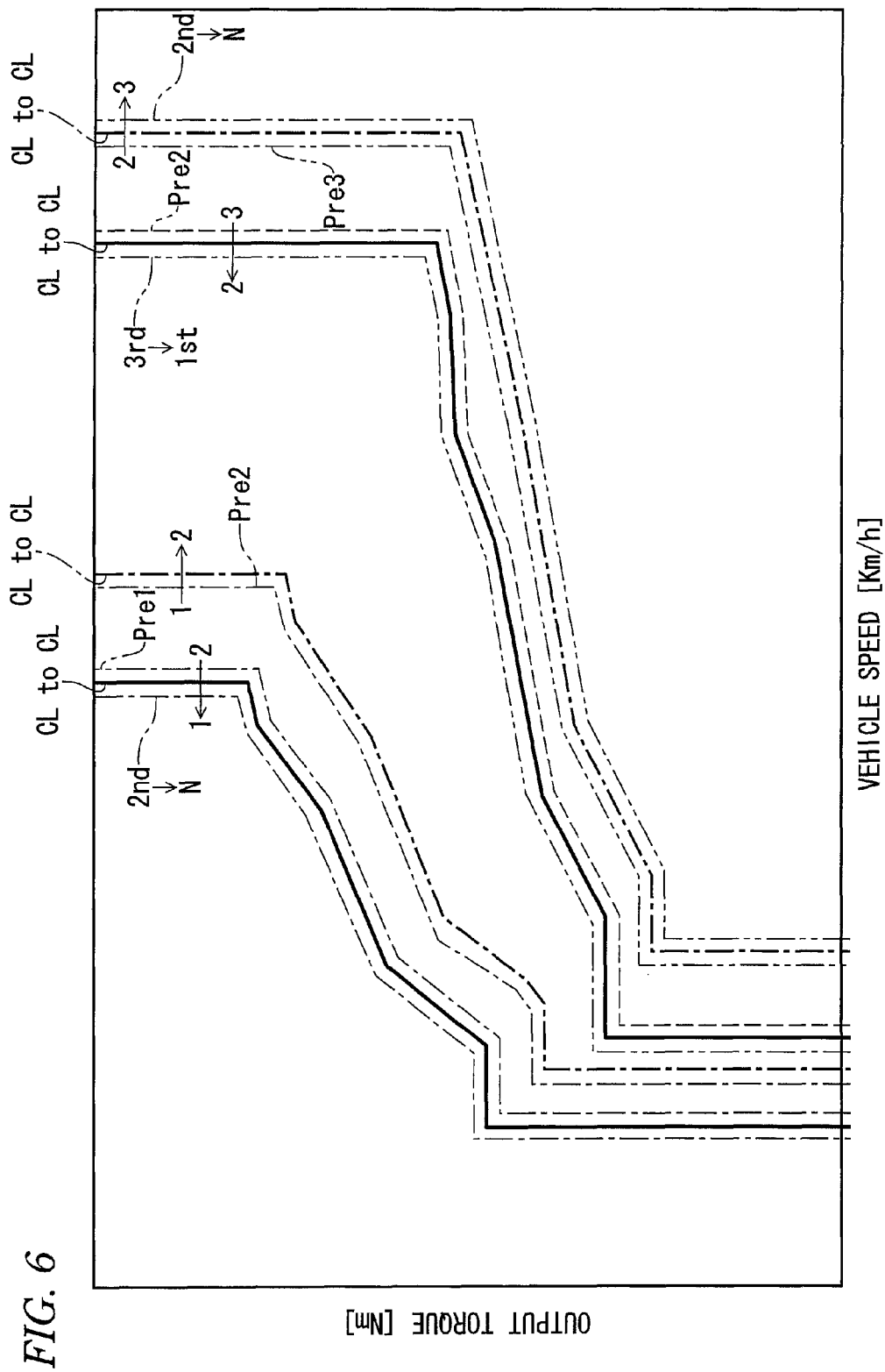
FIG. 6 shows part of the shift map in an enlarged fashion.

The shift map M has for each gear level an upshift line and a downshift line which are individually offset from a BSFC bottom torque line which bottom traces a BSFC of the engine 6 while following the BSFC bottom torque line. In addition, as shown in FIG. 6, the shift map M has pre-shift lines which follow the upshift and downshift lines so as to implement a pre-shifting to the next gear level immediately before the upshift line and the downshift lines are crossed. A hysteresis is provided between the upshift line and the downshift line so as to suppress a shift hunting in which transitions between shift states occur frequently.

In addition, as shown in FIG. 7, the upshift line, the downshift line and the pre-shift line are offset to a high torque side when the motor 7 has torque available for assistance and is allowed to assist with a pre-shifting to a gear which is one gear lower implemented.

Further, the upshift line, the downshift line and the pre-shift line are offset to the high torque side or a low torque side according to an upper limit output torque of the engine 6. For example, when a reduction in outside atmospheric pressure is detected by the outside atmospheric pressure sensor 59 as a result of the vehicle being driven in a hill area, leading to a reduction in upper limit output torque of the engine, the upshift line, the downshift line and the pre-shift line are offset to the low torque side, whereby the engine 6 can be used in low speed gears for a long time period, thereby obtaining a desired torque. Consequently, as shown in a table in FIG. 7, gears to be selected in areas a, b are changed according to the positions of the shift lines.

In this embodiment, in a normal driving where neither the output of the battery nor the operation of the motor is limited, when the vehicle is being driven by selecting an even-numbered gear (a second gear level), a pre-shifting to an odd-numbered gear (a first gear level) which is one gear lower is implemented.

Specifically, as shown in FIG. 6, when implementing an upshifting from the first speed driving to the second speed driving, a pre-shifting is implemented by engaging the second gear change shifter 52 in the second speed engaging position, and thereafter, the second clutch 42 is applied and the first clutch 41 is released, whereby the driving force of the engine 6 is transmitted to the driving wheels DW, DW via the second transmission path. However, the engagement of the lock mechanism 61 in the first speed engaging position is held.

When implementing a downshifting from the third speed driving to the second speed driving, a pre-shifting is implemented by engaging the second gear change shifter 52 in the second speed engaging position, and thereafter, the second clutch 42 is applied and the first clutch 41 is released, whereby the driving force of the engine 6 is transmitted to the driving wheels DW, DW via the second transmission path. As this occurs, the first gear change shifter 51 is released from the third speed engaging position to the neutral position, and the lock mechanism 61 is engaged in the first speed engaging position.

By so doing, while the vehicle is being driven by selecting the second speed, the pre-shifting is implemented to the first speed gear. Also in the second speed driving, the motor 7 is allowed to assist and to implement regeneration. Additionally, by implementing a regeneration with a pre-shifting to an odd-numbered gear which is one gear lower implemented, it becomes possible to implement a more efficient regeneration than a regeneration which is implemented with a pre-shifting to an odd-numbered gear which is one gear upper implemented.

Additionally, in an upshifting from the second speed driving (the even-numbered gear) to the third speed driving (the odd-numbered gear), a pre-shifting is implemented by engaging the first gear change shifter 51 in the third speed engaging position, and thereafter, the first clutch 41 is applied and the second clutch 42 is released, whereby the driving force of the engine 6 is transmitted to the driving wheels DW, DW via the third transmission path. Then, the second gear change shifter 52 is released from the second speed engaging position to the neutral position. In addition, in a downshifting from the second speed driving (the even-numbered gear) to the first speed driving (the odd-numbered gear), a pre-shifting is implemented by engaging the lock mechanism 61 in the first speed engaging position, and thereafter, the first clutch 41 is applied and the second clutch 42 is released, whereby the driving force of the engine 6 is transmitted to the driving wheels DW, DW via the third transmission path. Then, the second gear change shifter 52 is released from the second speed engaging position to the neutral position.

Figure 8:
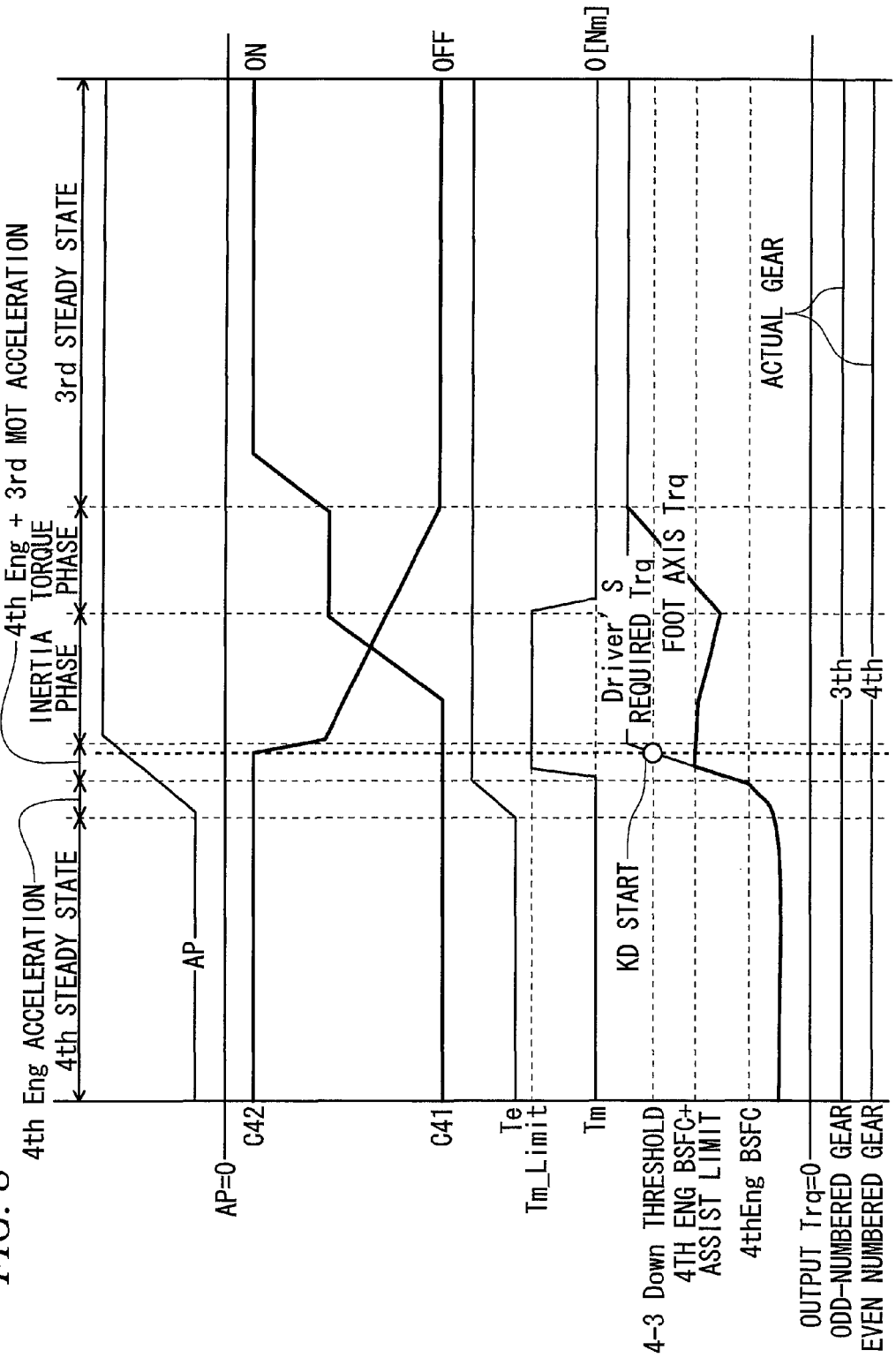
FIG. 8 shows a change in state when a downshifting is implemented from a fourth speed driving in which a pre-shifting to a third speed gear is implemented.
Figure 9:
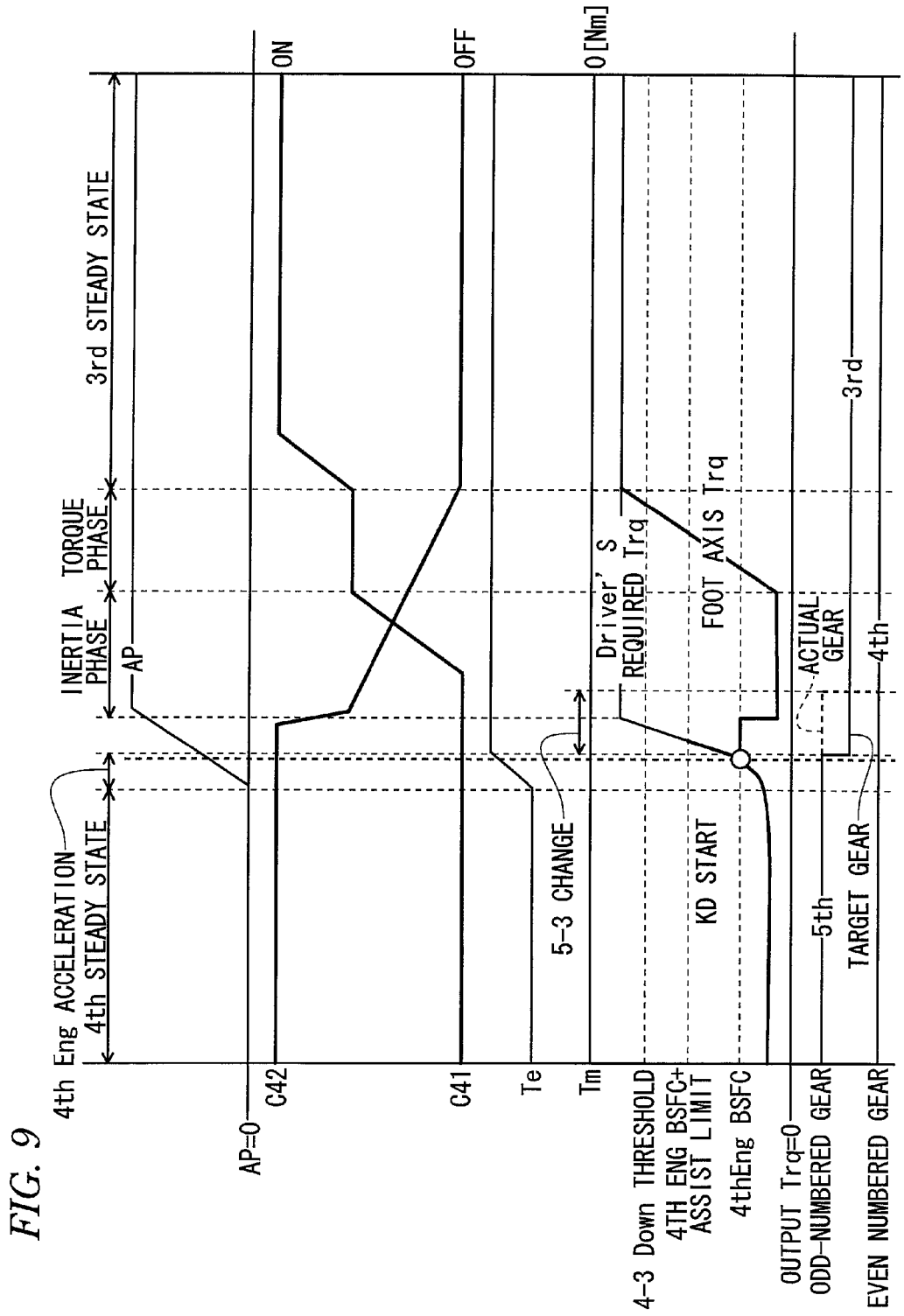
FIG. 9 shows a change in state when a downshifting is implemented from a fourth speed driving in which a pre-shifting to a fifth speed gear is implemented.

Additionally, as shown in FIG. 8, in the event that a required driving force by the driver surpasses a BSFC bottom torque output of the engine 6 while the vehicle is being driven in an even-numbered gear (a fourth speed) where a pre-shifting to an odd-numbered gear which is one gear lower (a third speed gear) is implemented, the required driving force can be met with the assistance of the motor 7 with no gear change to the odd-numbered gear. In the event that a downshifting (kickdown) is implemented due to further depression of the accelerator pedal, the drawing in of an inertia phase can be cancelled by the assistance of the motor 7, thereby suppressing the loss of driving force. On the other hand, as shown in FIG. 9, in the event that a downshifting is implemented while the vehicle is being driven in the even-numbered gear (the fourth speed) where a pre-shifting to an odd-numbered gear which is one gear upper (a fifth speed gear), since the gears are changed to an odd-numbered gear which is one gear lower, no assistance is given by the motor 7 during the gear change, and hence, a large driving force is lost during the gear change. In FIG. 8 and subsequent drawings, reference character AP denotes accelerator pedal opening, Ne denotes the revolution speed of the engine 6, Nm denotes the revolution speed of the motor 7, C41 denotes the state of the first clutch 41, C42 denotes the state of the second clutch 42, Te denotes the torque of the engine 6, Tm denotes the assistance or regenerated torque by the motor 7, and Tds denotes an output from the counter shaft.

Figure 10A:
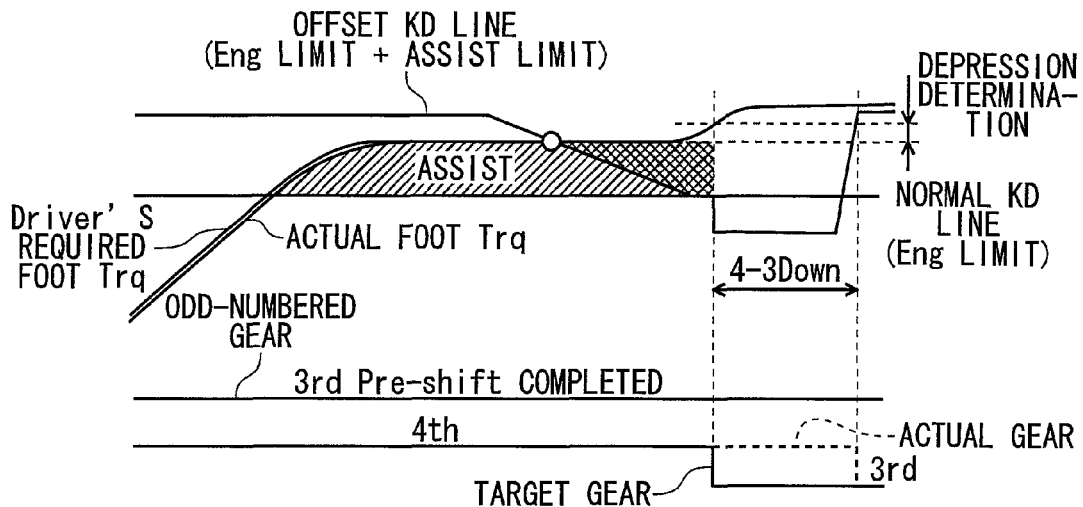
FIG. 10A illustrates a case where a downshift timing when the assistance of a motor is provided is set to a time point when a depression is determined.
Figure 10B:
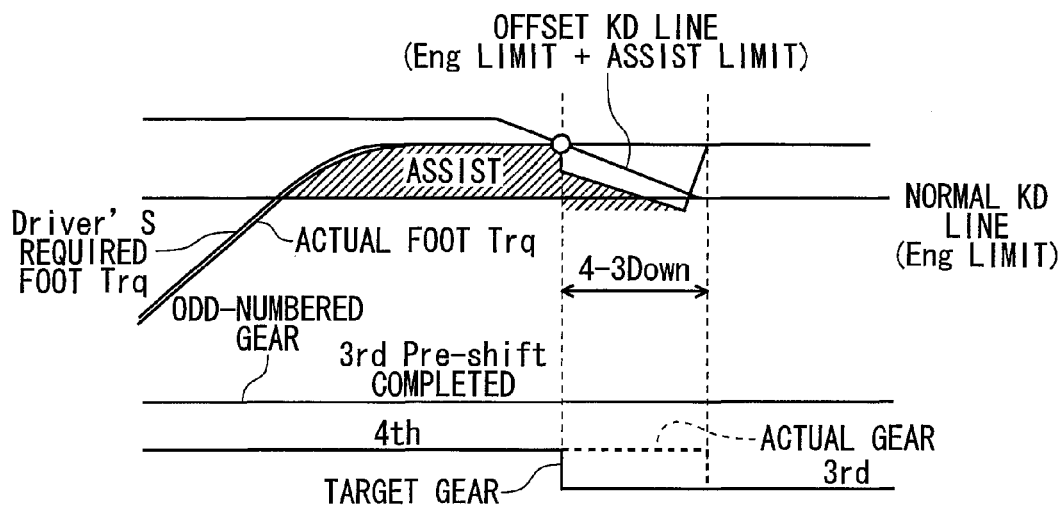
FIG. 10B illustrates a case where the downshift timing when the assistance of the motor is provided is set to a time point when the motor cannot assist in meeting a required driving force.

In addition, as shown in FIG. 10B, when the motor 7 is allowed to assist, a normal kickdown line (KD line), that is, a KD line is set which is offset by an assist limit relative to a drive limit of the engine. As this occurs, the KD line is lowered as the SOC decreases as a result of the motor 7 assisting, and therefore, a kickdown is implemented when the required driving force required by the driver cannot be met although the depression of the accelerator pedal is constant.

Because of this, in this embodiment, as shown in FIG. 10A, a kickdown is prevented even when the assist amount gradually decreases as the SOC decreases and a deviation (a hatched portion in FIG. 10A) from the required driving force is produced, thereby implementing the required driving force but is allowed upon the depression of the accelerator pedal by the driver as a trigger. By so doing, the kickdown can be implemented at a required timing by the driver without causing the driver to feel a sensation of physical disorder.

Figure 11:
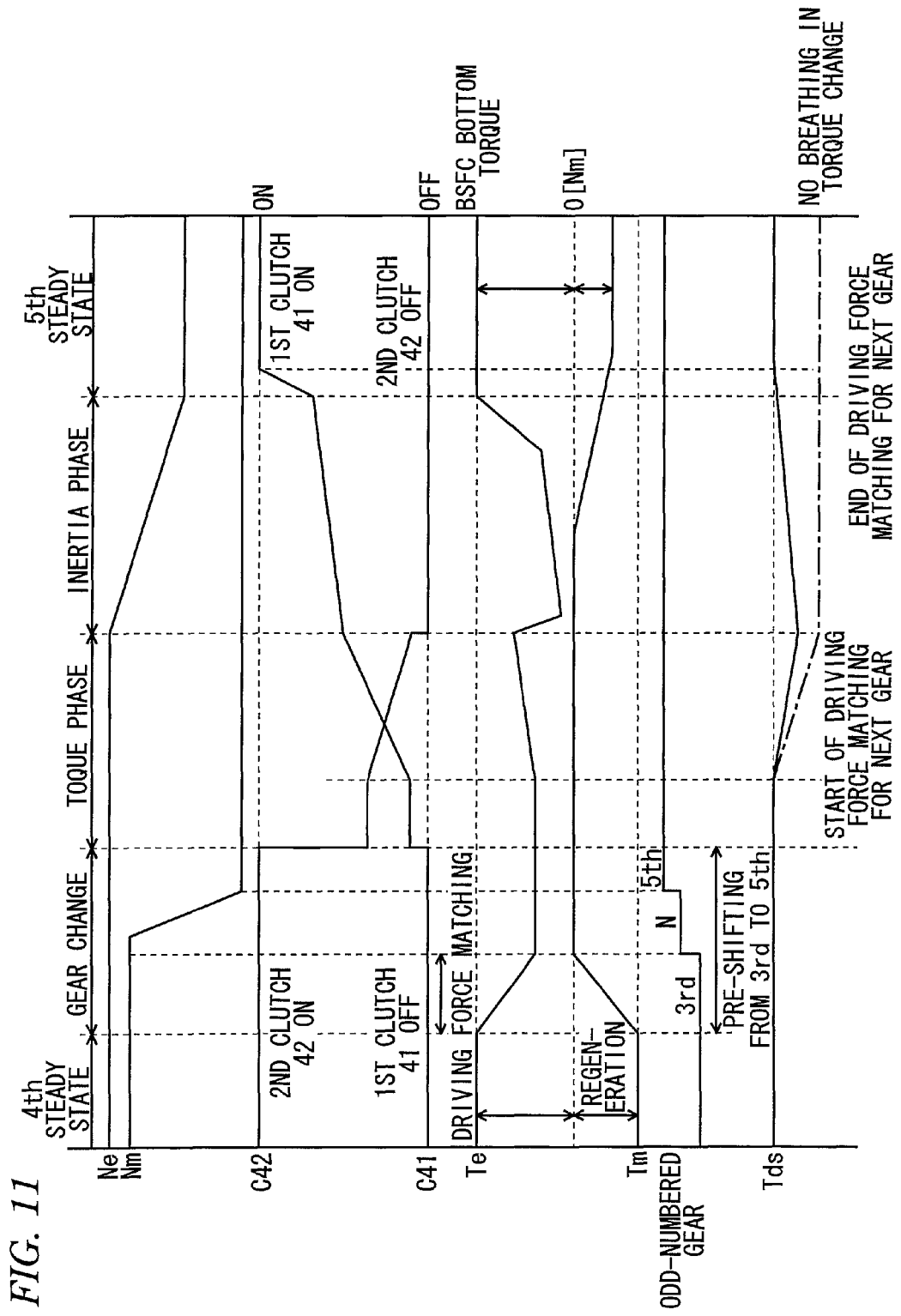
FIG. 11 shows a change in state when an upshifting is implemented from a fourth speed driving in which a pre-shifting to a third speed gear is implemented to a fifth speed driving.

FIG. 11 shows a change in state when a pre-shifting to the third speed gear is implemented and an upshifting from the fourth speed driving in which the motor 7 is operating for regeneration to the fifth speed driving. In this case, the control unit 5 controls the motor 7 so that the regenerated torque Tm of the motor 7 becomes 0 [Nm] before the transmission path of the transmission 20 is switched from the second transmission path via the fourth speed gear pair 24 to the third transmission path via the fifth speed gear pair 25 and decreases the torque Te of the engine 6 which is in a BSFC (Brake Specific Fuel Consumption) bottom operation for driving force matching. The BSFC bottom operation means a constant point operation at a constant revolution speed where a least fuel consumption is provided. Then, the engaging position of the first gear change shifter 51 of the motor 7 is switched from the third speed engaging position to the fifth speed engaging position.

Next, the control unit 5 increases the degree of engagement of the first clutch 41 at the same time as a torque phase starts where the engaged state of the second clutch 42 starts to be released. Then, the driving force matching is implemented to a specified extent based on the clutch torque of the first clutch 41. Thereafter, the first clutch 41 starts to be engaged, and in an inertia phase where the engine revolution speed decreases, the driving force matching is further implemented through the remaining extent based on an input-to-output revolution speed ratio GRatio to thereby complete the driving force matching during the gear change. Then, the first clutch 41 is completely engaged, and the driving of the vehicle is switched to the fifth speed driving.

The input-to-output revolution speed ratio GRatio means a value that results when a revolution speed ratio of the first main shaft 11 to the counter shaft 14 is corrected based on a given table (not shown). Because of this, the GRatio converges to a certain range based on respective gear ratios of the gear levels provided that the clutch is completely engaged and varies gradually according to the degree of engagement when the gears are changed, and therefore, the GRatio can be an index that indicates the degree of progression of a gear change.

Additionally, when the vehicle is being driven by selecting an even-numbered gear with the motor 7 overspeeding (a higher revolution speed than a given revolution speed), the motor 7 being in a high temperature state (at a higher temperature than a first given temperature) or the battery 3 being in a cryogenic temperature state (at a lower temperature than a second given temperature), an abnormal increase in temperature of the motor 7 is prevented, and the output of the battery 3 is reduced to thereby reduce the output of the motor 7. Therefore, a pre-shifting to a higher odd-numbered gear than the current even-numbered gear is implemented. As this occurs, however, the assistance given by the motor 7 should fall within the range of the driving force of the engine 6.

Figure 12:
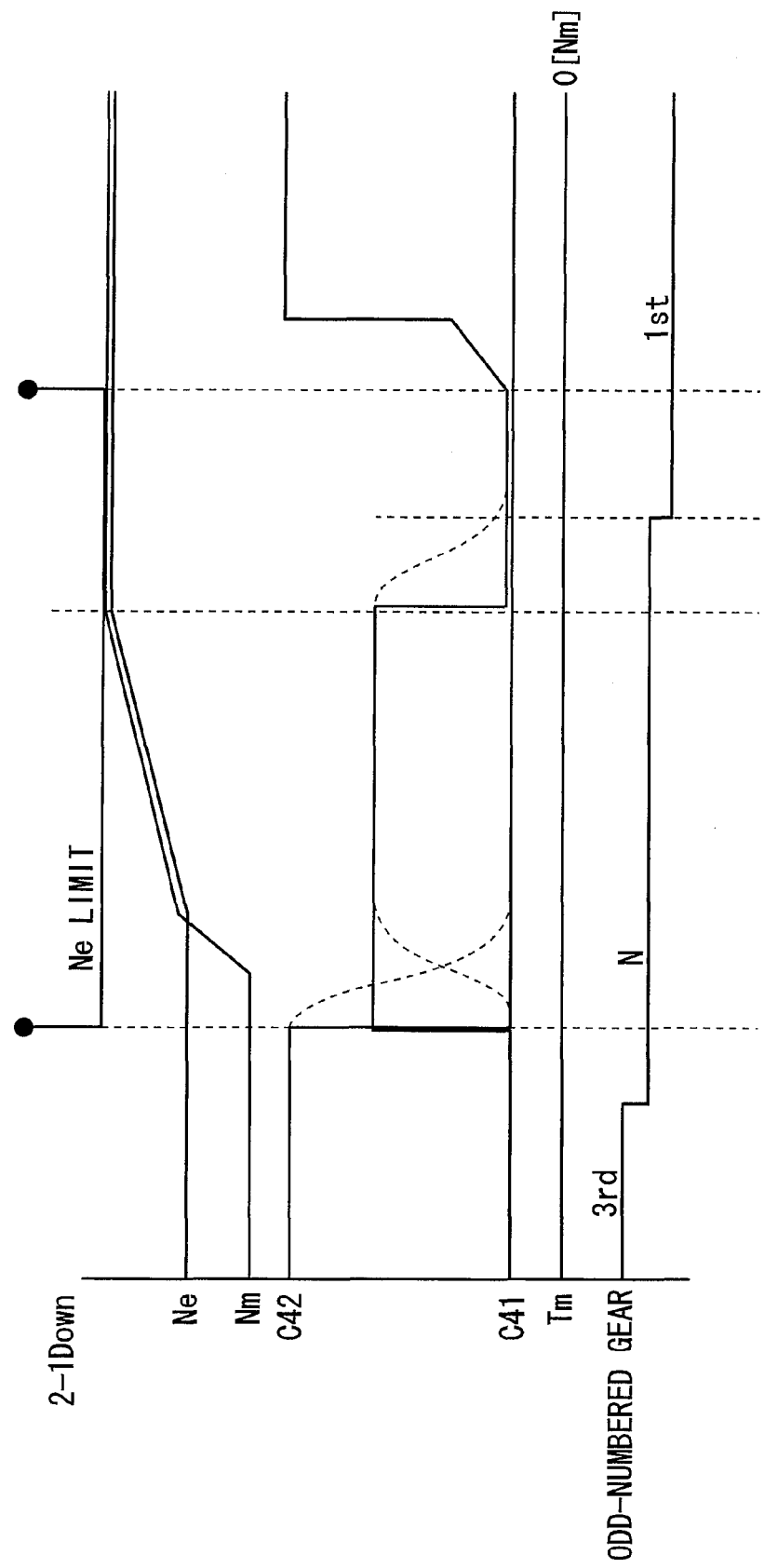
FIG. 12 shows a change in state when a downshifting is implemented from a second speed driving in which a battery is in a cryogenic temperature state to a first speed driving.

As shown in FIG. 12, in the second speed driving in which the battery 3 is in the cryogenic temperature state and a pre-shifting to the third speed gear which is one gear upper is implemented, when a downshifting from the second speed to the first speed is implemented, the first gear change shifter 51 is released from the third speed engaging position to the neutral position, whereafter the second clutch 42 is released, while the first clutch 41 is slide engaged into a partial clutch engagement state, and the revolution speed of the motor 7 is matched with the revolution speed of the engine 6 so that the revolution speeds of both the motor 7 and the engine 6 are controlled so as not to drop. Thereafter, with the first clutch 41 released, the lock mechanism 61 is engaged in a first speed engaging position, and the first clutch 41 is applied. By so doing, a shock can be suppressed which would otherwise be produced when the lock mechanism 61 is engaged in the first speed engaging position in downshifting.

Figure 13:
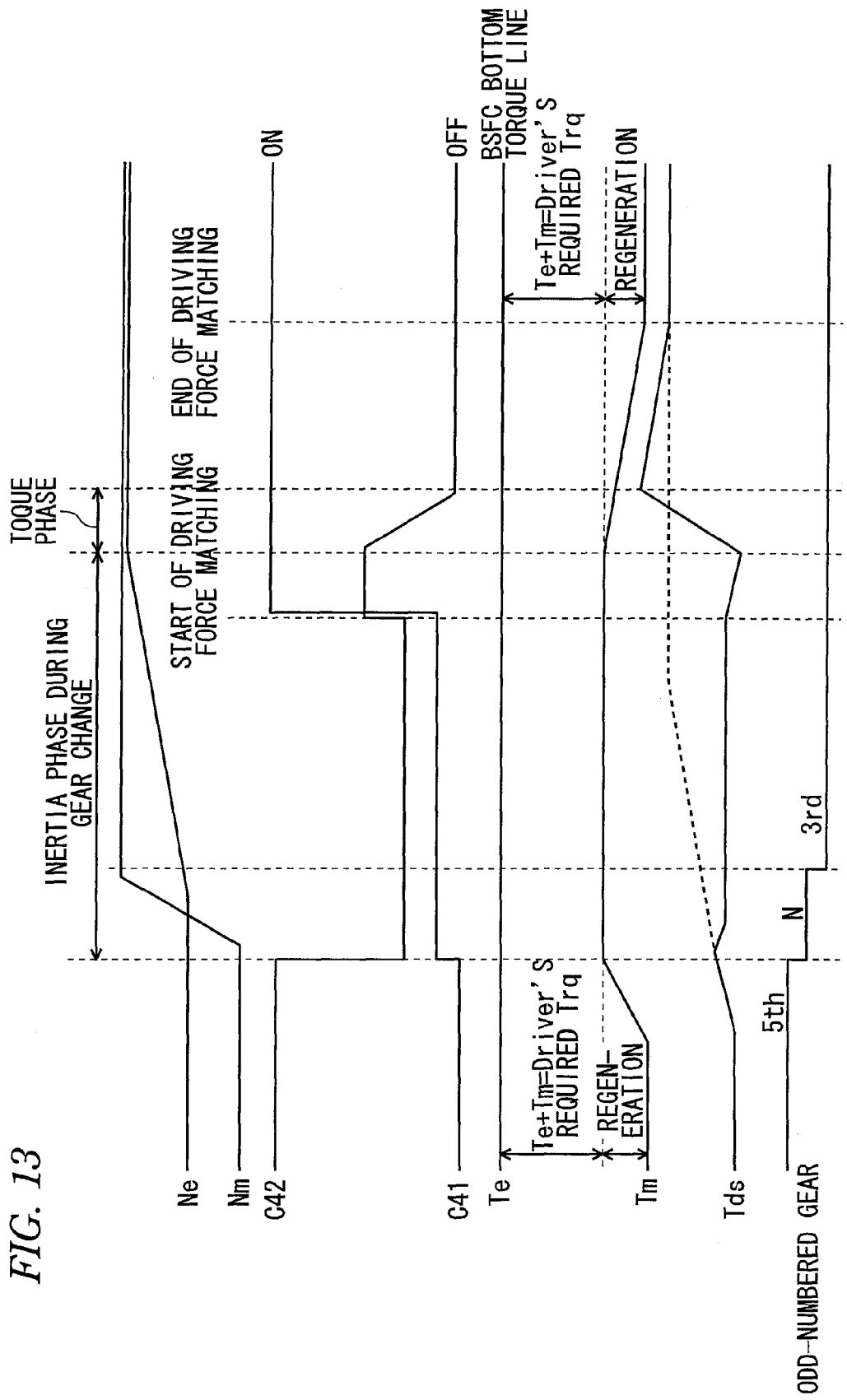
FIG. 13 shows a change in state when a downshifting is implemented from a state where a pre-shifting to a fifth speed gear is implemented in a fourth speed driving to a third speed gear.

Further, FIG. 13 shows a change in state occurring when a downshifting from a state where the fifth speed gear which is one gear upper is pre-shifted in the fourth speed driving to the third speed gear which is one gear lower is implemented. When assuming that the downshift line is set to the BSFC bottom torque line except for the situation in which the throttle is fully opened, the regeneration amount of the motor 7 gradually decreases as the accelerator pedal is depressed. When the downshift line is reached, the regeneration amount becomes 0 Nm. At this time point, the first clutch 41 is engaged while being slid, while the engagement of the second clutch 42 is partially released, and the position of the first gear change shifter 51 is switched from the fifth speed engaging position to the third speed engaging position. The engine 6 keeps the output which follows the BSFC bottom torque line, and the first clutch 41 is applied completely, so that the surplus torque is gradually absorbed by the regeneration of the motor 7 from a time point when the inertia phase ends.

Figure 14:
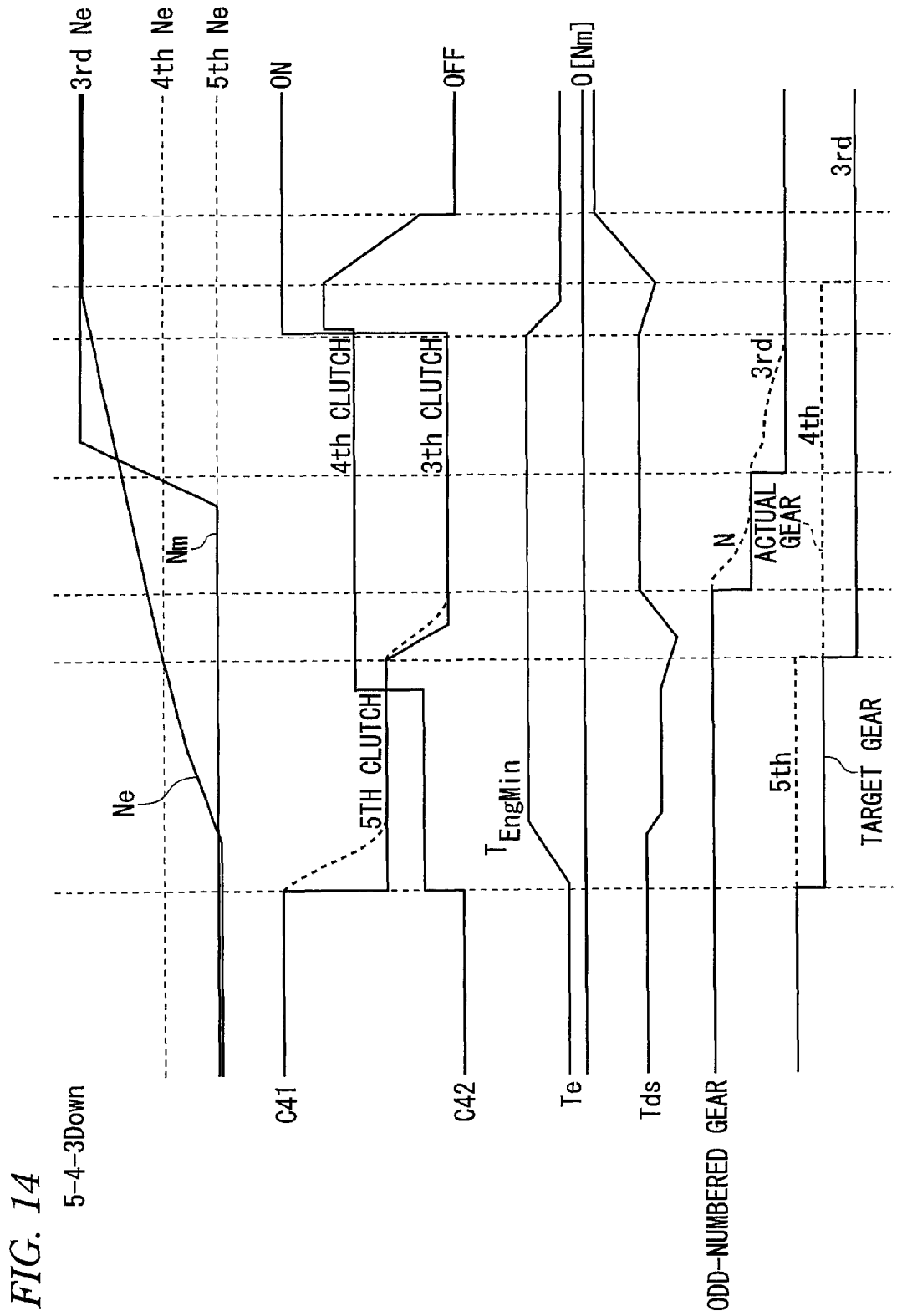
FIG. 14 shows a change in state when a kickdown is implemented from a fifth speed driving to a third speed driving.

Additionally, as shown in FIG. 14, when a kickdown to the third speed is implemented due to a drastic increase in accelerator pedal opening with the vehicle being driven by selecting the fifth speed, the first clutch 41 is started to be released, while the second clutch 42 is started to be engaged. Then, the engagement of the second clutch 42 is put in the slide engagement state while the revolution speed of the engine 6 is increasing in the inertia phase to be switched to the fourth speed gear once. Then, after the first clutch 41 is released from the slide engagement state, the position of the first gear change shifter 51 is switched from the fifth speed engaging position to the third speed engaging position. Thereafter, the engagement of the second clutch 42 is released, and by engaging the first clutch 41, a downshifting to the third speed is implemented. The length of the inertia phase is determined based on whether a target gear for downshifting is the fourth speed gear which is one gear lower or the third speed gear which is two gears lower.

Figure 15:
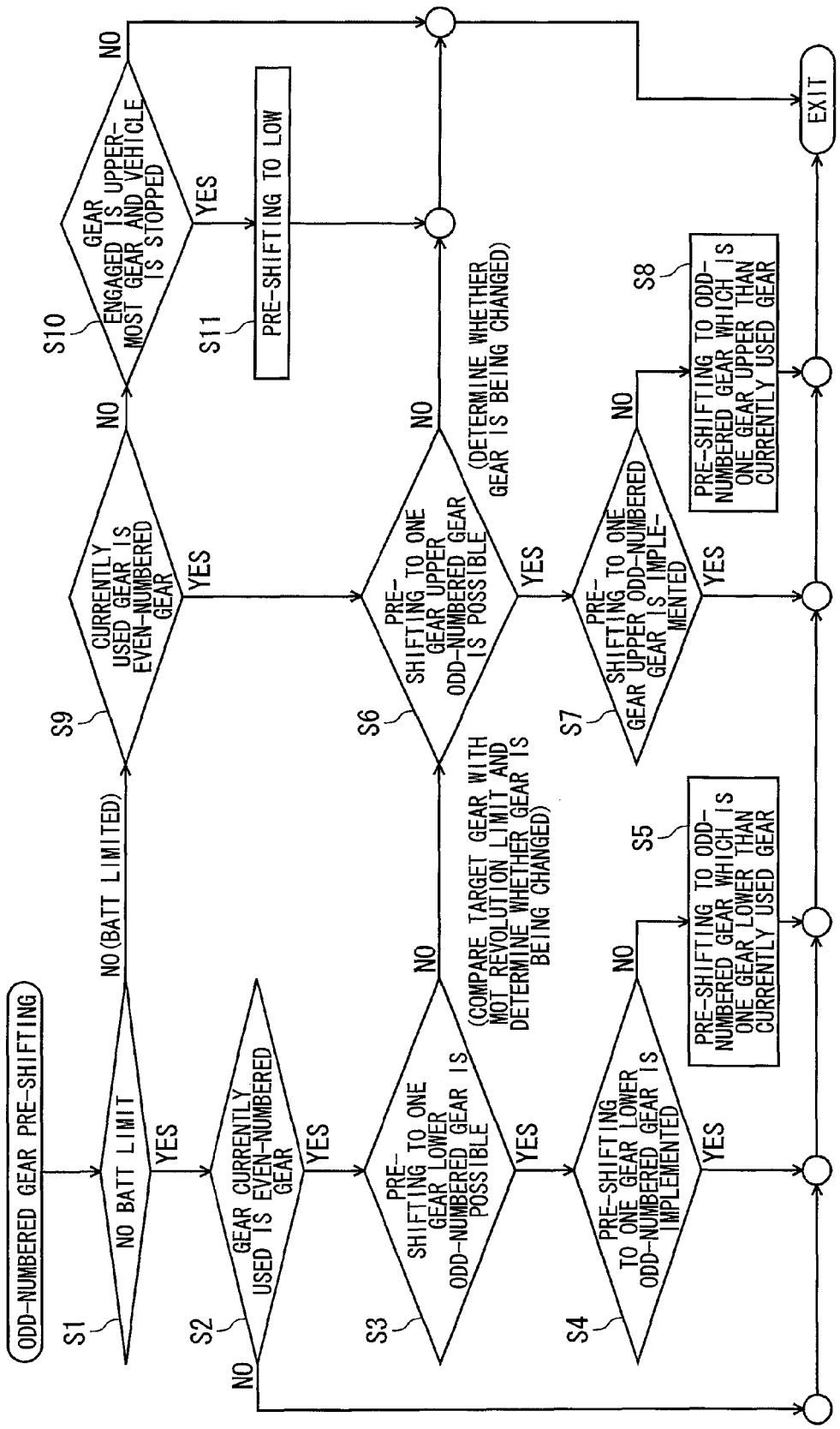
FIG. 15 shows a control flow of a pre-shifting to an odd-numbered gear.

Here, the control of pre-shifting to the odd-numbered gears of the invention will be described by reference to FIG. 15.

Firstly, it is determined in step S1 whether or not the SOC and temperature of the battery are limited. Then, if Yes in step S1, that is, if the output of the battery 3 is not limited, the flow proceeds to step S2, where it is determined whether or not the gear in which the vehicle is being driven is the even-numbered gear. If No in step S2, that is, the gear in which the vehicle is being driven is the odd-numbered gear, the process ends then. If Yes in step S2, that is, the gear in which the vehicle is being driven is the even-numbered gear, the flow proceeds to step S3, where it is determined whether or not a pre-shifting to the odd-numbered gear which is one gear lower is possible. Specifically, a comparison of a target gear with the revolution limit of the motor 7 is made, and it is determined whether or not the gears are being changed. Then, if Yes in step 3, that is, if it is determined that the pre-shifting is possible, it is determined in step S4 whether or not a pre-shifting to the odd-numbered gear which is one gear lower has been implemented. If the pre-shifting has already been implemented, the process ends then. If it is determined that the pre-shifting has not yet been implemented, the pre-shifting to the odd-numbered gear which is one gear lower than the gear in which the vehicle is currently being driven in step S4.

In addition, if No in step S3, that is, if the pre-shifting to the odd-numbered gear which is one gear lower is not possible, it is determined in step S6 whether or not a pre-shifting to the odd-numbered gear which is one gear upper is possible. Specifically, it is determined whether or not the gears are being changed. Then, if Yes in step S6, that is, if the pre-shifting is possible, it is determined in step S7 whether or not a pre-shifting to the odd-numbered gear which is one gear upper has been implemented. If it is determined that the pre-shifting has already been implemented, the process ends then. If it is determined that the pre-shifting has not yet been implemented, the per-shifting to the odd-numbered gear which is one gear upper is implemented in step S8.

On the other hand, if No in step S1, that is, if the output of the battery 3 is limited, the flow proceeds to step S9, where it is determined whether or not the gear in which the vehicle is being driven is the even-numbered gear. If Yes in step S9, that is, if the gear in which the vehicle is being driven is the even-numbered gear, the flow proceeds to step S6 described before, where it is determined whether or not the pre-shifting to the odd-numbered gear which is one gear upper is possible.

Additionally, if No in step S9, that is, if the gear in which the vehicle is being driven is the odd-numbered gear, the flow proceeds to step S10, where it is determined whether or not the gear engaged is the highest gear and the vehicle is stopped. If Yes in step S10, a pre-shifting to the first speed is implemented (step S11), and on the other hand, if No, the process ends then.

Thus, as has been described heretofore, according to the hybrid vehicle driving system 1 of the embodiment, even in the configuration in which the power of the motor 7 is transmitted to the counter shaft 14 only via the third speed gear pair 23 or the fifth speed gear pair 25 which are both provided on the first main shaft 11, when the vehicle is driven by selecting the even-numbered gear, by the lock mechanism 61 or the first gear change shifter 51, the pre-shifting to the odd-numbered gear which is lower than the even-numbered gear is implemented, whereby good driveability can be provided with the assistance of the motor 7, and a more efficient regeneration can be implemented.

The invention is not limited to the above-described embodiment, but can be modified or improved as required.

For example, in the vehicle driving system 1, the odd-numbered gears are disposed on the first main shaft 11 which is the input shaft of the dual clutch transmission to which the motor 7 is connected and the even-numbered gears are disposed on the second intermediate shaft 16 which is the input shaft to which the motor 7 is not connected. However, the invention is not limited thereto. The even-numbered gears may be disposed on the first main shaft 11 which is the input shaft to which the motor 7 is connected, and the odd-numbered gears may be disposed on the second intermediate shaft 16 which is the input shaft to which the motor 7 is not connected.

As odd-numbered gears, in addition to the planetary gear mechanism 30 which functions as the first speed drive gear and the third speed drive gear pair 23 and the fifth speed drive gear pair 25, a seventh, ninth, . . . drive gear pairs may be provided, and as even-numbered gears, in addition to the second speed drive gear pair 22 and the fourth speed drive gear pair 24, a sixth, eighth, . . . drive gear pairs may be provided.

While the first common driven gear 23*b* which commonly meshes with the second speed drive gear 22*a* and the third speed drive gear 23*a* and the second common driven gear 24*b* which commonly meshes with the fourth speed drive gear 24*a* and the fifth speed drive gear 25*a* are provided as the driven gears that are mounted on the counter shaft 14, the invention is not limited thereto. Pluralities of driven gears may be provided which are adapted to mesh individually with the drive gears. In addition, while the planetary gear mechanism 30 is described as the first speed drive gear, the invention is not limited thereto, and hence, as with the third speed drive gear 23*a* and the like, a first speed drive gear may be provided.

Figure 16:
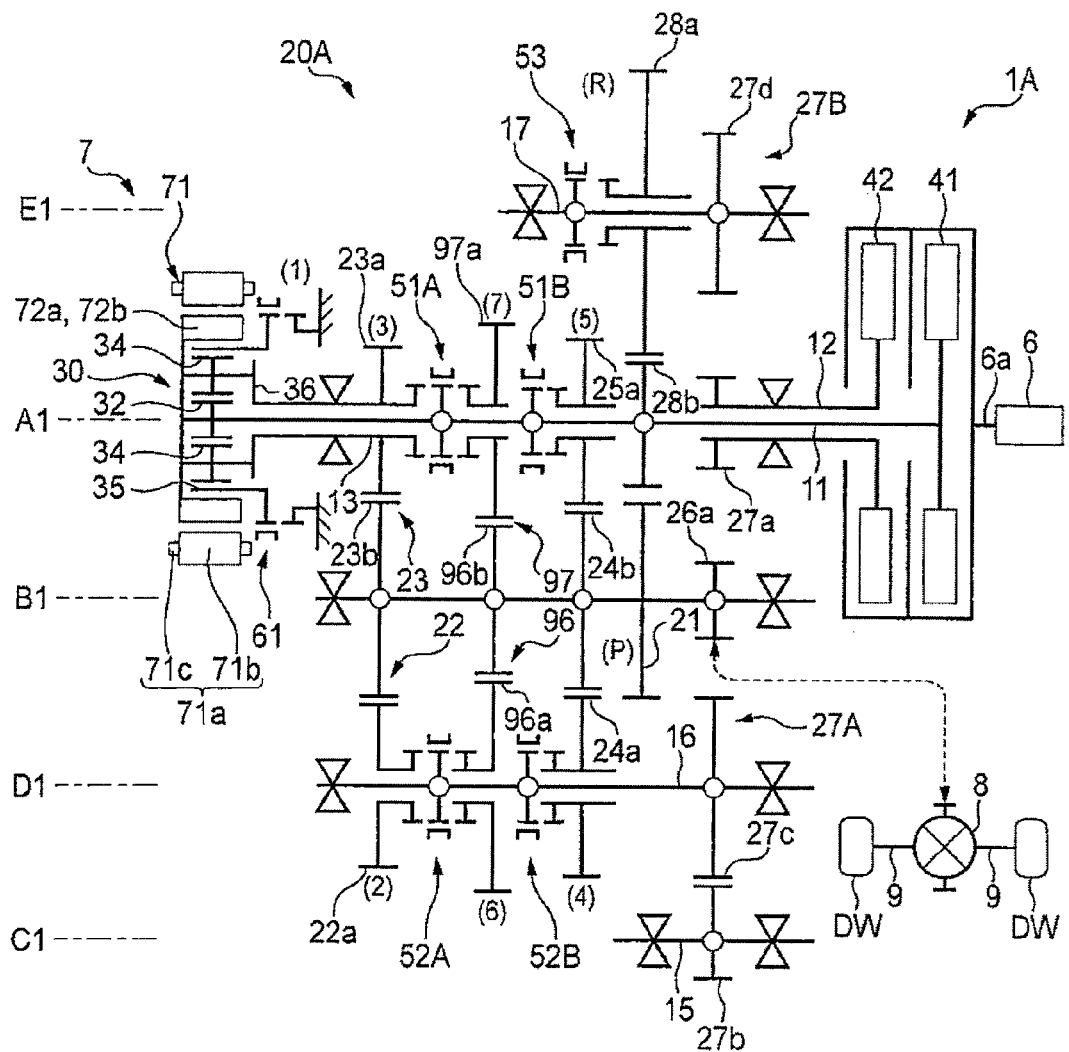
FIG. 16 schematically shows a driving system according to a modified example of the invention.
Figure 17:
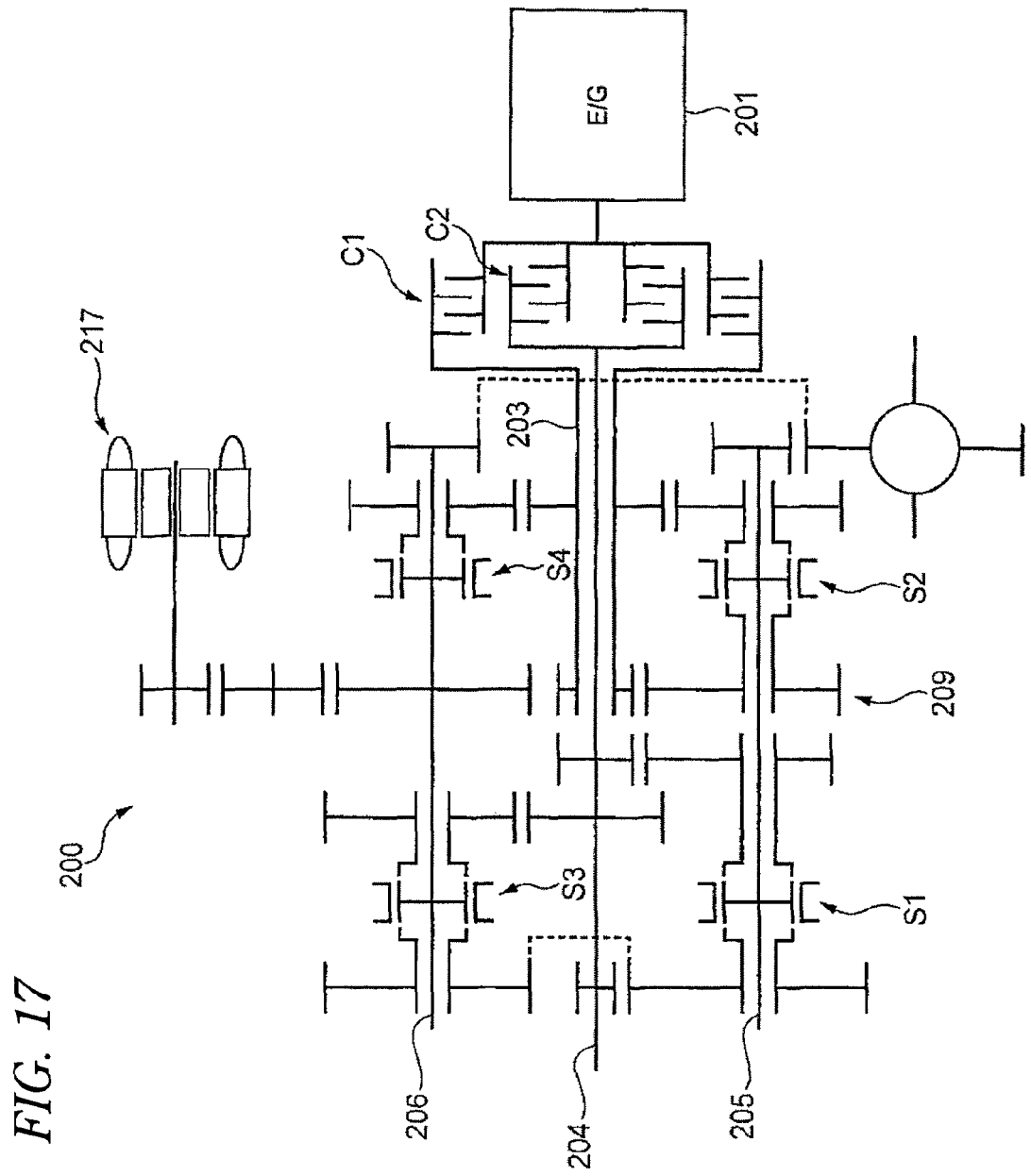
FIG. 17 schematically shows a vehicle driving system of Patent Literature 1.

For example, a different driving system 1A shown in FIG. 16 differs from the driving system 1 in that a sixth speed gear pair 96 and a seventh speed gear pair 97 are provided in a transmission 20A in addition to a planetary gear mechanism 30 and second to fifth gear pairs 22 to 25. Hereinafter, the driving system 1A will be described while focusing on differences from the above-described driving system 1.

A seventh speed drive gear 97*a* is provided between a third speed drive gear 23*a* and a fifth speed drive gear 25*a* on a first main shaft 11 so as to rotate relative to the first main shaft 11. Additionally, a first gear change shifter 51A is provided between the third speed drive gear 23*a* and the seventh speed drive gear 97*a* so as to connect the first main shaft 11 with the third speed drive gear 23*a* or with the seventh speed drive gear 97*a* or release the connection between the first main shaft 11 with the drive gear, and a third gear change shifter 51B is provided between the seventh speed drive gear 97*a* and the fifth speed drive gear 25*a* so as to connect the first main shaft 11 with the fifth speed drive gear 25*a* or release the connection of the first main shaft with the drive gear. Then, when the first gear change shifter 51A is engaged in a third speed engaging position, the first main shaft 11 and the third speed drive gear 23*a* are connected together so as to rotate together. When the first gear change shifter 51A is engaged in a seventh speed engaging position, the first main shaft 11 and the seventh speed drive gear rotate together. When the first gear change shifter 51A is in a neutral position, the first main shaft 11 rotates relative to the third speed drive gear 23*a* and the seventh speed drive gear 97*a*. Additionally, when the third gear change shifter 51B is engaged in a fifth speed engaging position, the first main shaft 11 and the fifth speed drive gear 25*a* are connected together so as to rotate together, and when the third gear change shifter 51B is in a neutral position, the first main shaft 11 rotates relative to the fifth speed drive gear 25*a*.

A sixth speed drive gear 96*a* is provided between a second speed drive gear 22*a* and a fourth speed drive gear 24*a* on a second intermediate shaft 16 so as to rotate relative to the second intermediate shaft 16. Additionally, a second gear change shifter 52A is provided between the second speed drive gear 22*a* and the sixth speed drive gear 96*a* so as to connect the second intermediate shaft 16 with the second speed drive gear 22*a* or the sixth speed drive gear 96*a* or release the connection of the intermediate shaft with the drive gear, and a fourth gear change shifter 52B is provided between the sixth speed drive gear 96a and the fourth speed drive gear 24a so as to connect the second intermediate shaft 16 with the fourth speed drive gear 24a or release the connection of the intermediate shaft with the drive gear. Then, when the second gear change shifter 52A is engaged in a second speed engaging position, the second intermediate shaft 16 and the second speed drive gear 22a rotate together, and when the second gear change shifter 52A is engaged in a sixth speed engaging position, the second intermediate shaft 16 and the sixth speed drive gear 96a rotate together. In addition, when the second gear change shifter 52A is in a neutral position, the second intermediate shaft 16 rotates relative to the second speed drive gear 22a and the sixth speed drive gear 96a. Additionally, when the fourth gear change shifter 52B is engaged in a fourth speed engaging position, the second intermediate shaft 16 and the fourth speed drive gear 24a are connected together so as to rotate together. When the fourth gear change shifter 52B is in a neutral position, the second intermediate shaft 16 rotates relative to the fourth speed drive gear 24a.

A third common driven gear 96b is mounted integrally on a counter shaft 14 between a first common driven gear 23b and a second common driven gear 24b. Here, the third common driven gear 96b meshes with the seventh speed drive gear 97a which is provided on the first main shaft 11 so as to make up a seventh speed gear pair 97 together with the seventh speed drive gear 97a and meshes with the sixth speed drive gear 96a which is provided on the second intermediate shaft 16 so as to make up a sixth speed gear pair 26 together with the sixth speed drive gear 96a.

Then, a sixth speed driving can be implemented by engaging a second clutch 42 with the second gear change shifter 52A engaged in the sixth speed engaging position, and a seventh speed driving can be implemented by engaging a first clutch 41 with the first gear change shifter 51A engaged in the seventh speed engaging position, in which cases a motor 7 is allowed to assist or charge a battery.

The invention is based on Japanese Patent Application (No. 2010-105477) filed on Apr. 30, 2010, the contents of which are incorporated herein by reference.

DESCRIPTION OF REFERENCE NUMERALS

1, 1A Vehicle driving system
2 Control unit
3 Battery (Battery unit)
6 Engine (Internal combustion engine)
7 Motor (Electric motor)
11 First main shaft (First input shaft)
12 Second main shaft (Second input shaft)
14 Counter shaft (Output shaft)
16 Second intermediate shaft
20, 20A Transmission
22 Second speed gear pair
23 Third speed gear pair
24 Fourth speed gear pair
25 Fifth speed gear pair
30 Planetary gear mechanism
41 First clutch (First engaging/disengaging unit)
42 Second clutch (Second engaging/disengaging unit)
51 First gear change shifter (First Synchromesh unit)
52 Second gear change shifter (Second synchromesh unit)
61 Lock mechanism (First synchromesh unit).

The invention claimed is:

1. A hybrid vehicle driving system, including:
   an internal combustion engine;
   an electric motor;
   a battery unit which supplies electric power to the electric motor; and
   a transmission mechanism including
      a first input shaft which is connected to the electric motor and which is connected selectively to the internal combustion engine via a first engaging/disengaging unit,
      a second input shaft which is connected selectively to the internal combustion engine via a second engaging/disengaging unit,
      a first change-speed gear mechanism which can configure a plurality of first gear levels in a power transmission path between the first input shaft and a driven portion,
      a second change-speed gear mechanism which can configure a plurality of second gear levels in a power transmission path between the second input shaft and a driven portion,
      a first synchromesh unit which switches the first change-speed gear mechanism so as to select any one of the first gear levels and
      a second synchromesh unit which switches the second change-speed gear mechanism so as to select any one of the second gear levels,
   wherein, when the vehicle is being driven by selecting a given second gear level by the second synchromesh unit, a pre-shifting to a first gear level which is lower than the given second gear level is implemented by the first synchromesh unit.

2. The system of claim 1,
   wherein, in the event that the electric motor is overspeeding, the electric motor is in a high temperature state, or the battery is in a cryogenic temperature state, when the vehicle is being driven by selecting the given second gear level by the second synchromesh unit, a pre-shifting to a first gear level which is upper than the given second gear level is implemented by the first synchromesh unit.

3. The system of claim 2,
   wherein, in the event that the battery is in the cryogenic temperature state, when downshifting from the given second gear level, the first engaging/disengaging unit is slide engaged to match a revolution speed of the electric motor with a revolution speed of the internal combustion engine, whereafter with the first engaging/disengaging unit released, a first gear level which is one gear lower is selected by the first synchromesh unit, and thereafter, the first engaging/disengaging unit is applied.

4. The system of claim 1,
   wherein, when the vehicle is being driven by selecting a given first gear level by the first synchromesh unit, in the event that a downshifting to a first gear level which is two gears lower is implemented due to a drastic increase in accelerator pedal opening, with both the first and second engaging/disengaging units applied by bringing both of them into slide engagement, the first change-speed gear mechanism is continuously switched from the given first gear level to the first gear level which is two gears lower via a second gear level which is one gear lower during an inertia phase thereof.

5. The system of claim 1,
   wherein a shift map has an upshift line and a downshift line which are set individually to be offset from a BSFC bottom torque line which bottom traces a BSFC of the internal combustion engine for each gear level, and the upshift line and the downshift line have individually a pre-shift line for implementing a pre-shifting to the next gear level immediately before the upshift line and the downshift line are crossed.

6. The system of claim 5,
wherein the shift map offsets the upshift line, the downshift line and the pre-shift line to a high torque side according to a torque of the electric motor which is available for assistance.

7. The system of claim 5,
wherein the shift map offsets the upshift line, the downshift line and the pre-shift line to the high torque side or a low torque side according to an upper limit output torque of the internal combustion engine.

8. The system of claim 1,
wherein a pre-shifting to a first gear level which is one gear lower than the given second gear level by the first synchromesh unit is implemented by
holding the first gear level which is one gear lower when upshifting to the given second gear level from the first gear level which is one gear lower, and
engaging the first gear level which is one gear lower when downshifting to the given second gear level from a first gear level which is one gear upper.

9. The system of claim 1,
wherein, in the event that an output of the internal combustion engine surpasses a BSFC bottom torque line of the internal combustion engine,
when a pre-shifting to a first gear level which is one gear lower than the given second gear level is implemented, or a kickdown to a lowest possible gear level is implemented, the electric motor performs an assistance, and
when the pre-shifting is not implemented, the assistance by the electric motor is prohibited.

10. The system of claim 1,
wherein, in the event that a pre-shifting to the first gear level is implemented by the first synchromesh unit when the vehicle is being driven by selecting the given second gear level, power that is transmitted to the internal combustion engine via the second engaging/disengaging unit can be absorbed by regeneration of the electric motor.

11. The system of claim 1,
wherein a downshift line of a shift map is set to a BSFC bottom torque line except for a state where a throttle is fully opened, and
wherein, with the vehicle being driven by selecting the given second gear level, when a downshifting to a first gear level which is one gear lower is implemented due to an increase in accelerator pedal opening from a state where the first gear level which is one gear upper is pre-shifted, the internal combustion engine holds an output along the BSFC bottom torque line, a gear change is implemented when the torque of the electric motor becomes 0 Nm, and surplus torque is absorbed by regeneration of the electric motor from a time point when an inertia phase ends.

\* \* \* \* \*